(12) United States Patent
Yim et al.

(10) Patent No.: US 11,775,983 B2
(45) Date of Patent: Oct. 3, 2023

(54) METHOD AND SYSTEM OF PROVIDING SERVICE BY CONTROLLING ROBOT IN SERVICE AREA, AND ROBOT IMPLEMENTING THEREOF

(71) Applicant: LG ELECTRONICS INC., Seoul (KR)

(72) Inventors: Jungbin Yim, Seoul (KR); Sangwoon Lee, Seoul (KR); Jiin Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 443 days.

(21) Appl. No.: 16/887,725

(22) Filed: May 29, 2020

(65) Prior Publication Data

US 2021/0174370 A1 Jun. 10, 2021

(30) Foreign Application Priority Data

Dec. 9, 2019 (KR) .................. 10-2019-0163032

(51) Int. Cl.
*G06Q 30/00* (2023.01)
*B25J 9/16* (2006.01)
(Continued)

(52) U.S. Cl.
CPC .......... *G06Q 30/016* (2013.01); *B25J 9/0084* (2013.01); *B25J 9/1682* (2013.01); *B25J 11/008* (2013.01); *B25J 11/0045* (2013.01); *G06Q 10/02* (2013.01); *G06Q 10/06315* (2013.01); *G06Q 10/06316* (2013.01);
(Continued)

(58) Field of Classification Search
CPC ............... G06Q 30/016; G06Q 10/02; G06Q 10/06315; G06Q 10/06316; G06Q 30/0281; G06Q 30/0631; G06Q 30/0633; G06Q 50/12; B25J 9/0084; B25J 9/1682; B25J 11/0045; B25J 11/008; B25J 9/161; G05B 2219/45111; G05B 2219/50391; G06V 40/172; G06V 20/10

See application file for complete search history.

(56) References Cited

U.S. PATENT DOCUMENTS 7,174,830 B1 * 2/2007 Dong .................... B25J 9/0087
99/348
11,093,995 B2 * 8/2021 Kawamura .......... G06Q 20/203
(Continued)

FOREIGN PATENT DOCUMENTS

JP 2019003360 A * 1/2019 ............ A47J 36/321
WO WO-2016034269 A1 * 3/2016 ............ A47J 36/321

*Primary Examiner* — Michael Jared Walker
(74) *Attorney, Agent, or Firm* — Birch, Stewart, Kolasch & Birch, LLP

(57) ABSTRACT

The present disclosure relates to a method for providing service by controlling robots within a service area and a robot implementing the method, and according to an embodiment of the present disclosure, a system of providing service by controlling robots within the service area include a control server configured to receive customer information on customer seated at a table within the service area and ordered menu item information from a guide robot or a table robot disposed in the service area and transmit, to a cooking robot, the received information and cooking instruction information generated based on a situation of a plurality of orders placed within the service area and a plurality of robots.

16 Claims, 12 Drawing Sheets

(51) Int. Cl.
  *B25J 11/00* (2006.01)
  *G06Q 50/12* (2012.01)
  *G06Q 30/06* (2023.01)
  *G06Q 10/02* (2012.01)
  *G06Q 30/02* (2023.01)
  *G06Q 10/06* (2023.01)
  *B25J 9/00* (2006.01)
  *G06V 40/16* (2022.01)
  *G06Q 30/016* (2023.01)
  *G06Q 30/0601* (2023.01)
  *G06Q 10/0631* (2023.01)

(52) U.S. Cl.
  CPC ..... *G06Q 30/0281* (2013.01); *G06Q 30/0631* (2013.01); *G06Q 30/0633* (2013.01); *G06Q 50/12* (2013.01); *G06V 40/172* (2022.01); *G05B 2219/45111* (2013.01); *G05B 2219/50391* (2013.01)

(56) References Cited

U.S. PATENT DOCUMENTS

| | | | |
|---|---|---|---|
| 2002/0165638 A1* | 11/2002 | Bancroft | G07F 17/16 700/245 |
| 2015/0100439 A1* | 4/2015 | Lu | B25J 9/1602 901/1 |
| 2018/0047029 A1* | 2/2018 | Saso | G06Q 30/016 |
| 2019/0270204 A1* | 9/2019 | Kawamura | B25J 13/06 |
| 2019/0275676 A1* | 9/2019 | Jensen | B25J 13/006 |
| 2020/0054175 A1* | 2/2020 | Roy | B25J 9/0084 |
| 2020/0398437 A1* | 12/2020 | Hao | B25J 5/00 |
| 2021/0139065 A1* | 5/2021 | Ha | B62B 3/108 |

\* cited by examiner

METHOD AND SYSTEM OF PROVIDING SERVICE BY CONTROLLING ROBOT IN SERVICE AREA, AND ROBOT IMPLEMENTING THEREOF

CROSS-REFERENCE TO RELATED APPLICATION

This application claims priority to and the benefit of Korean Patent Application No. 10-2019-0163032, filed on Dec. 9, 2019, the disclosure of which is incorporated herein by reference in its entirety.

BACKGROUND

1. Field of the Invention

The present disclosure relates to a method for providing service by controlling robots in a service area and a robot implementing the method.

2. Description of Related Art

Automation service may be used in stores where interactive service is provided, such as restaurants, cafes, and bakeries. For example, ordering may be performed autonomously in various types of stores using an order computer.

Customers may know how to place automatic orders. In addition, service other than orders has not been automated. The automation may be performed slowly due to variables occurring within a service area and composite automation devices may be used to perform the automation because people may move irregularly.

Accordingly, there is a need for a technology for providing the automation service in a store by performing distribution and concentration of automation areas within the store by a robot. In the present disclosure, a method for performing, by the robot, interactive tasks and automation tasks within a service area as a dynamic environment is described.

SUMMARY OF THE INVENTION

The present disclosure is made to solve the above-mentioned problems and provides a technology for exchanging information to perform tasks within a service area by a plurality of robots.

The present disclosure also provides a technology for performing tasks, such as guidance, order reception, cooking, serving, dishwashing, and the like, by the plurality of robots in association with one another.

The present disclosure further provides a technology for providing efficient service in response to customer's behaviors within the service area.

The objects of the present disclosure are not limited to the above-mentioned objects, and the other objects and advantages of the present disclosure, which are not mentioned, may be understood by the following description, and more clearly understood by the embodiments of the present disclosure. It is also readily understood that the objects and the advantages of the present disclosure may be implemented by features described in appended claims and a combination thereof.

According to an embodiment of the present disclosure, a system of providing service by controlling robots within a service area may include a control server configured to receive customer information on a customer seated at a table disposed within the service area and ordered menu item information from a guide robot or a table robot disposed in the service area and transmit, to the cooking robot, the received information and cooking instruction information generated based on a situations of a plurality of orders placed within the service area.

According to an embodiment of the present disclosure, a system of providing services by controlling the robots within the service area may include a guide robot configured to move within the service area and guide the customer to a specific table.

According to an embodiment of the present disclosure, a system of providing the service by controlling the robots within the service area may include a serving robot configured to deliver food completed by the cooking robot to a table from which the order was received.

According to an embodiment of the present disclosure, a system of providing the service by controlling the robots within the service area may include a table robot disposed on the table and configured to receive ordered menu item information and output information on a situation in which the cooking robot cooks or the food delivered by the serving robot as voice information or visual information.

According to an embodiment of the present disclosure, a system of providing the service by controlling the robots within the service area may include a food material pickup robot configured to contain food materials used to perform the cooking based on cooking instruction information to a cooking dish and to deliver the cooking dish to the cooking robot.

According to an embodiment of the present disclosure, the system of providing the service by controlling the robots within the service area may include a dishwashing robot configured to receive information on a dish needed in the service area from the control server and to wash dishes by determining priorities of washing dishes based on the received information.

According to an embodiment of the present disclosure, a method for providing service by controlling robots within a service area may include receiving, by a control server, customer information on a customer seated at a table within the service area and ordered menu item information from the table within the service area and transmitting, by the control server, the received information and cooking instruction information generated based on a situation of a plurality of orders placed within the service area.

According to an embodiment of the present disclosure, a method for providing service by controlling the robots within the service area may include guiding, by the guide robot, the customer to a specific table while moving within the service area.

According to an embodiment of the present disclosure, a method for providing service by controlling the robots within the service area may include delivering food completed by the cooking robot to a table from which the order was received.

According to an embodiment of the present disclosure, a method for providing service by controlling the robots within the service area may include receiving, by the table robot disposed on the table, ordered menu item information and outputting information on a situation in which the cooking robot cooks or food delivered by the serving robot as voice information or visual information.

According to an embodiment of the present disclosure, the robot may include a communicator configured to receive ordered menu item information from a control server to monitor a service area or a table robot disposed in the service area, a controller configured to generate cooking instruction information based on the received information and a menu completion time determined based on a sequence or similarity among the foods ordered from a plurality of tables disposed in the service area, and temporal characteristics or serving characteristics of the ordered menu items, and a functional portion configured to perform cooking based on the cooking instruction information.

According to an embodiment of the present disclosure, the robot may include a functional portion configured to store serving objects, a communicator configured to receive serving object information from a control server to monitor a service area or a table robot disposed in the service area, or a cooking robot to cook food provided to the service area, a controller configured to determine a movement sensitivity level based on the serving material characteristics, table information on table to serve the objects, and complexity information on complexity within the service area, among the received information, and a mover configured to move the robots based on the determined movement sensitivity level.

When embodiments of the present disclosure are applied, the robots may be operated in association with one another within the service area through communication via the control server or communication among the robots.

When embodiments of the present disclosure are also applied, the robots may also perform special functions such as guidance, order reception, cooking, serving, or dishwashing within the service area and may share the information generated during performance of the functions with other robots within the service area to thereby improve an efficiency of providing the service.

The effect of the present disclosure is not limited to the above-mentioned effect, and those skilled in the art of the present disclosure may easily understand various effects of the present disclosure based on the disclosure of the present disclosure.

DETAILED DESCRIPTION OF EXEMPLARY EMBODIMENTS

Figure 1:
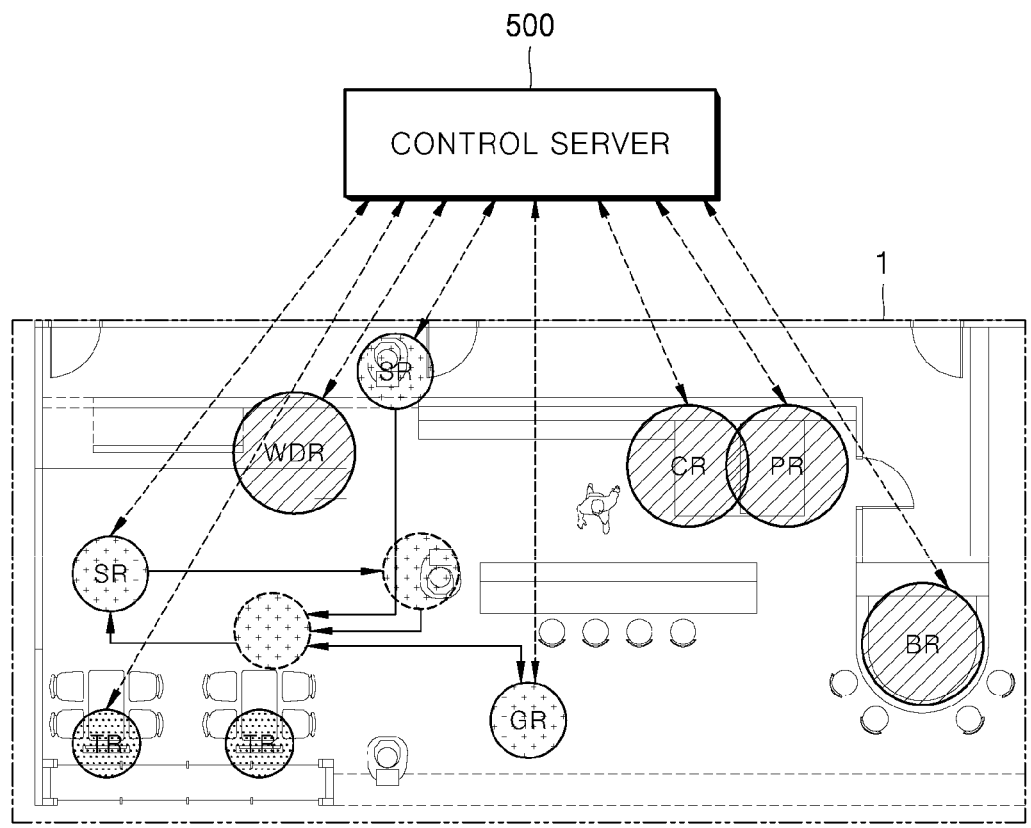
FIG. 1 shows an example system of providing automated service using a robot within a service area according to an embodiment of the present disclosure.

Hereinafter, exemplary embodiments of the present disclosure will be described in detail with reference to the accompanying drawings such that they may be easily practiced by those skilled in the art. The present disclosure may be embodied in many different manners and should not be construed as being limited to the embodiments set forth herein.

In some examples, portions irrelevant to the description of the present disclosure will be omitted for clarity. Moreover, same or similar elements are designated by a same reference numeral throughout the present disclosure. Also, some embodiments of the present disclosure will be described in detail with reference to the accompanying drawings. In adding reference numerals to elements in each figure, it should be noted the same elements will be designated by the same reference numerals, if possible, even though they are shown in different drawings. Further, in the following description of the present disclosure, a detailed description of known functions or configurations incorporated herein will be omitted when it is determined that the description may make the subject matter of the present disclosure rather unclear.

In some examples, terms such as first, second, A, B, (a), (b) and the like may be used herein when describing the elements of the present disclosure. The terms are intended to distinguish one element from other elements, and the essence, order, sequence, or number of corresponding elements is not limited by the terms. It should be understood that when any one element is described as being "connected," "combined," or "coupled" to another element, they may be connected, combined, or coupled to each other directly or with an intervening element therebetween.

Further, one element may be described as its sub-elements in implementing the present disclosure; however, the sub-elements may be implemented in a single device or module in an integrated manner or implemented in multiple devices or modules in a distributed manner.

Hereinafter, in the present disclosure, the robot may perform the following tasks for specific purposes. Robots may perform tasks such as cooking, picking up materials, dishwashing, delivering of dishes, delivering of finished dishes, guiding, cleaning, security, monitoring, and reservations. Further, in the present disclosure, the robot may perform a function suitable for a current situation, among the functions, according to characteristics of a space where the robot is disposed. Robots include fixed robots and mobile robots. In the present disclosure, the robot collectively refers to a device using a sensor and to perform a predetermined function. Also, some robot which can move in the service area may include wheels or other moving means for moving the robot based on predetermined information and sensor. And some robot may be fixed in the table or cooking area and perform a predetermined function. So, In the present disclosure, the robot may move in the area or may be fixed in predetermined place.

FIG. 1 shows an example system of providing automated service using a robot within a service area according to an embodiment of the present disclosure. FIG. 1 shows a central control server and the control server controls tasks of robots or enables the robots to exchange information. In the system in FIG. 1, the control server functions to instruct operation of robots or control the robots to exchange information.

Example operation of the system is summarized as follows with reference to FIG. 1. A control server 500 receives customer information on customer seated at the table within the service area and ordered menu item information from a guide robot GR or a table robot TR disposed in the service area 1. The control server 500 also transmit, to a cooking robot CR, the received information and cooking instruction information generated in consideration of a situation of a plurality of orders placed within the service area 1. In one example, the received information may be merged in the cooking instruction information. In the other example, the received information may be updated or confirmed using the cooking instruction information by the control server 500. The received information may be transmitted to the cooking robot in real time, and the cooking instruction information may be transmitted to the cooking robot in predetermined period, or vice versa. In the other example, the received information and the cooking instruction information may be transmitted simultaneously.

The guide robot GR moves within the service area and guides the customer to a specific table. The serving robot SR moves the food completed by the cooking robot CR to the table from which the order was received.

In addition, the table robot TR is disposed on the table and receives ordered menu item information and outputs information on a situation in which the cooking robot CR cooks or food delivered by the serving robot SR as voice information or visual information.

Figure 2:
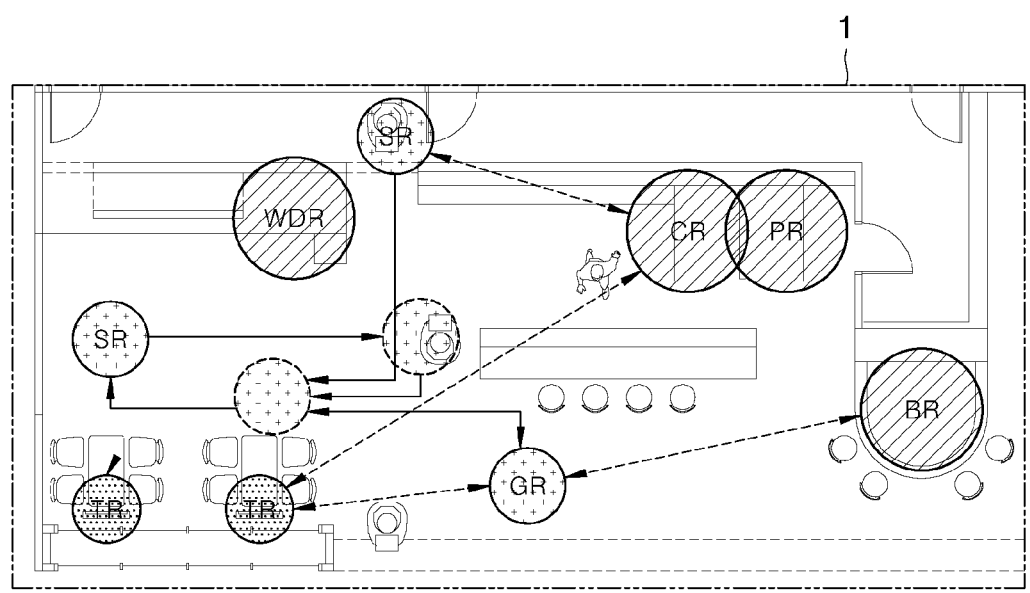
FIG. 2 shows an example system of providing automated service using a robot within a service area according to an embodiment of the present disclosure.

FIG. 2 shows an example system of providing automated service using a robot within a service area according to an embodiment of the present disclosure. FIG. 2 shows no central control server and robots exchange information through broadcasting or 1:1 or 1:N communication.

A difference between FIG. 1 and FIG. 2 corresponds to presence or absence of the control server 500. Robots according to an embodiment of the present disclosure are described as follows with reference to FIGS. 1 and 2.

A control server 500 may be disposed within or around a service area 1. Alternatively, the control server 500 may be spaced apart from the service area 1. The control server 500 determines movement of people within the service area 1 and transmits control information to each robot. Alternatively, each of the robots transmits the information to a target robot that needs that information such that the robots provide service in association with one another.

A plurality of robots are disposed within the service area 1. For example, robots such as table robots TR, guide robots GR, serving robots SR, cooking robots CR, food material pickup robots PR, dishwashing robots WDR, and barista robots BR are disposed within the service area 1.

The robots are classified according to performing tasks and at least one robot may perform at least two functions. For example, the guide robot and the serving robot may be implemented as separate robots or a single robot may perform both a guide function and a serving function.

Alternatively, a single function may be performed through the cooperation of multiple robots. The cooking process includes two detailed functions of picking up materials and cooking, and cooking may be performed through cooperation between the pickup robot PR and the cooking robot CR. Alternatively, a single robot may perform both a function for picking up food materials and a function for cooking.

The functions of robots are described below.

An example of the table robot TR includes a fixed robot. The table robot TR communications with customers on the table placed within the service area. The table robot TR may select food from the menu, take an order, and perform payment.

An example of the guide robot GR includes a mobile robot. The guide robot GR may perform a function for guiding a new customer to enter the service area 1 or guiding the customer after using the service to an exit. Alternatively, the guide robot GR may confirm reservation or take an order, and perform payment.

The table robot TR and the guide robot GR may operate independently and at least one of the table robot TR or the guide robot GR may perform functions of the table robot TR and the guide robot GR. For example, the guide robot GR may guide the customer to the table, may be stopped around the table, and may notify menus, take an order, and perform the payment before the customer leaves the table.

The serving robot SR performs a function for serving food to a customer or returning dishes provided to the customer to deliver the dishes to a dishwashing robot WDR. The serving robot may include a first serving robot to serve food and a second serving robot to deliver finished dishes according to configurations of the serving robot.

The cooking robot CR performs cooking according to instructions of the control server 500 or the guide robot GR and the table robot TR. The cooking robot CR may cooperate with the food material pickup robot. The food material pickup robot PR may also pick up the food materials according to instructions of the control server 500 or the guide robot GR and the table robot TR.

A dishwashing robot WDR performs a function for washing dishes delivered by a serving robot or by a person. A barista robot BR prepares coffee beverages according to customer's order interactively or by touch, or according to instructions from other robots (e.g., the guide robot and the table robot).

Referring to FIGS. 1 and 2, a plurality of robots perform their respective functions and receive information from a control server or other robots to automate customer guidance, ordering, cooking, serving, returning of dishes, and dishwashing.

In the configuration of FIG. 1, the control server 500 may perform 1:1 communication with robots as indicated by arrows. In the configuration of FIG. 2, each robot may transmit information to other robots through broadcasting as indicated by arrows.

As the arrows in each of FIGS. 1 and 2 show example communication, an example of communication scheme between the control server and each of the robots according to the present disclosure also include communication scheme, which is not indicated by arrows.

Figure 3:
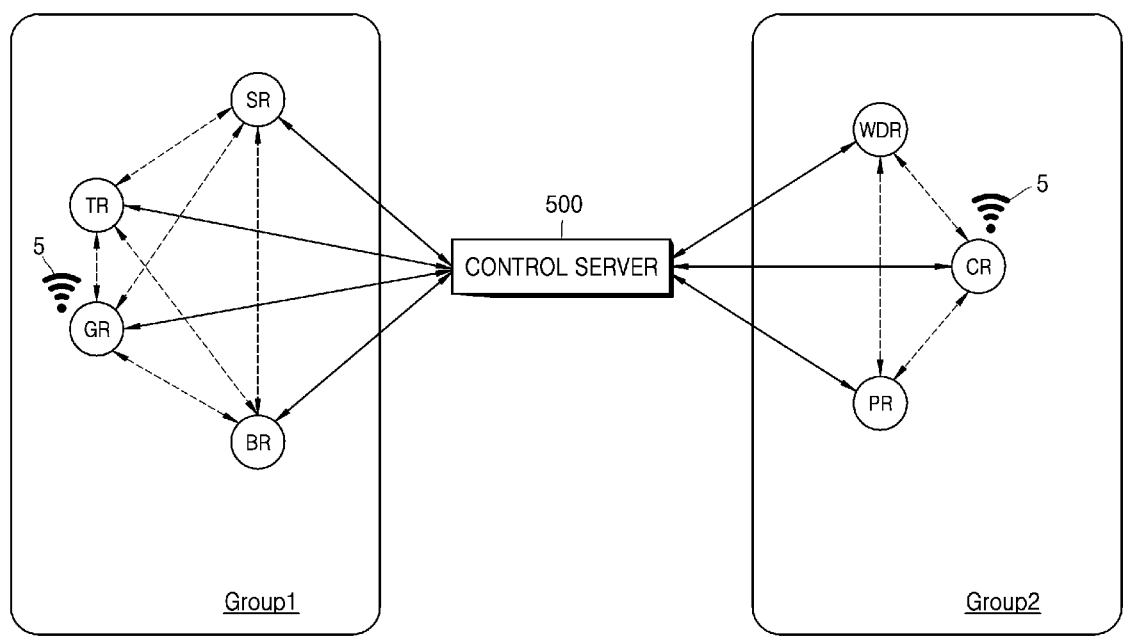
FIG. 3 shows an example process of exchanging information between a control server and each of robots according to an embodiment of the present disclosure.

FIG. 3 shows an example process of exchanging information between a control server and each of robots according to an embodiment of the present disclosure.

In some cases where a control server 500 is disposed as shown in FIG. 1, robots in each of a first group of robots (Group 1) and a second group of robots (Group 2) perform communication with each other through broadcasting indicated by "S" or 1:1 communication scheme indicated by dotted arrows. Each of the robots in the first group of robots may communicate with one of the robots in the second group of robots via the control server 500 as indicated by solid arrows.

For example, a guide robot GR, a table robot TR, a serving robot SR, and a barista robot BR included in a group of robots (Group 1) to directly respond to the customers perform broadcasting or perform 1:1 communication with one another.

In addition, a cooking robot CR, a food material pickup robot PR, and a dishwashing robot WDR included in a second group of robots (Group 2) that does not directly respond to customers perform broadcasting or perform 1:1 communication with one another.

In addition, the robots belonging to different groups of robots may communicate with each other via a control server 500. In this process, the control server 500 may readjust a sequence of messages or tasks transmitted among the robots based on congestion within a service area 1, an order processing state, and the like. This is also applicable to the case where all robots communicate with the control server 500 as shown in FIG. 1 above.

Figure 4:
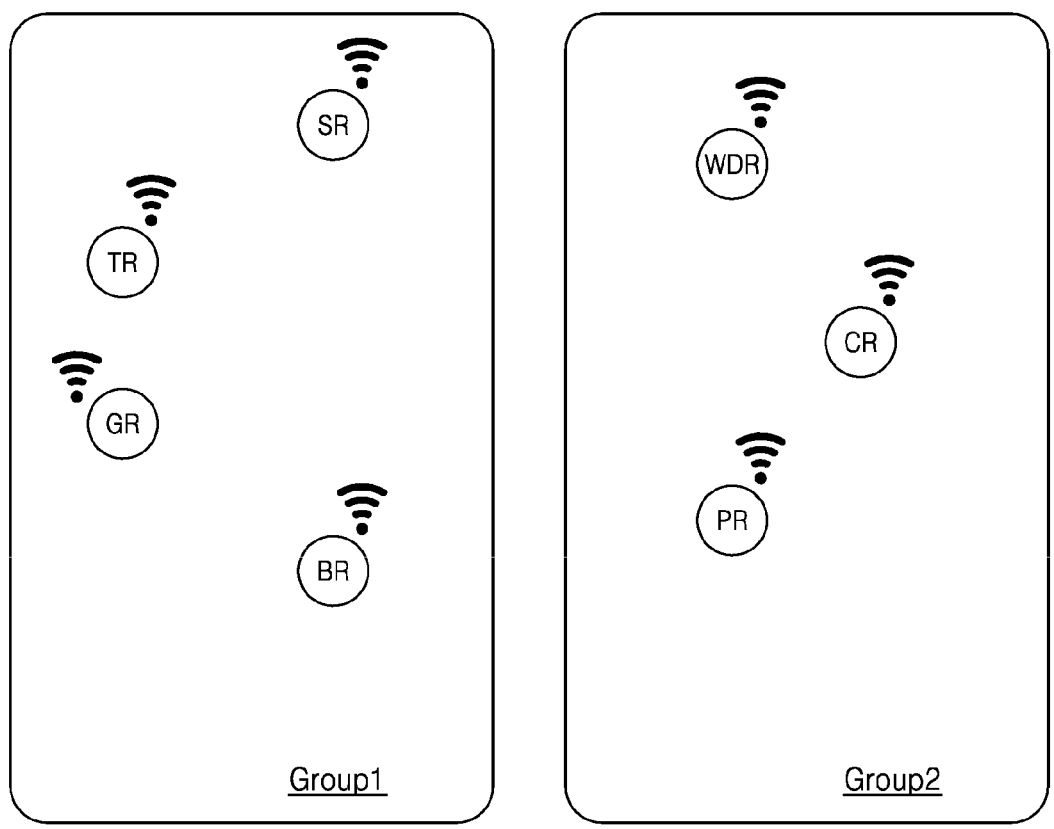
FIG. 4 shows an example process of exchanging information among robots according to an embodiment of the present disclosure.

FIG. 4 shows an example process of exchanging information among robots according to an embodiment of the present disclosure. FIG. 4 shows two groups of robots and a first robot transmits a message to a second robot through broadcasting. Each of the robots transmits the message to a receiving robot and a robot, which is not a receiver to receive the information through the broadcasting, may delete the received message without additional processing.

Figure 5:
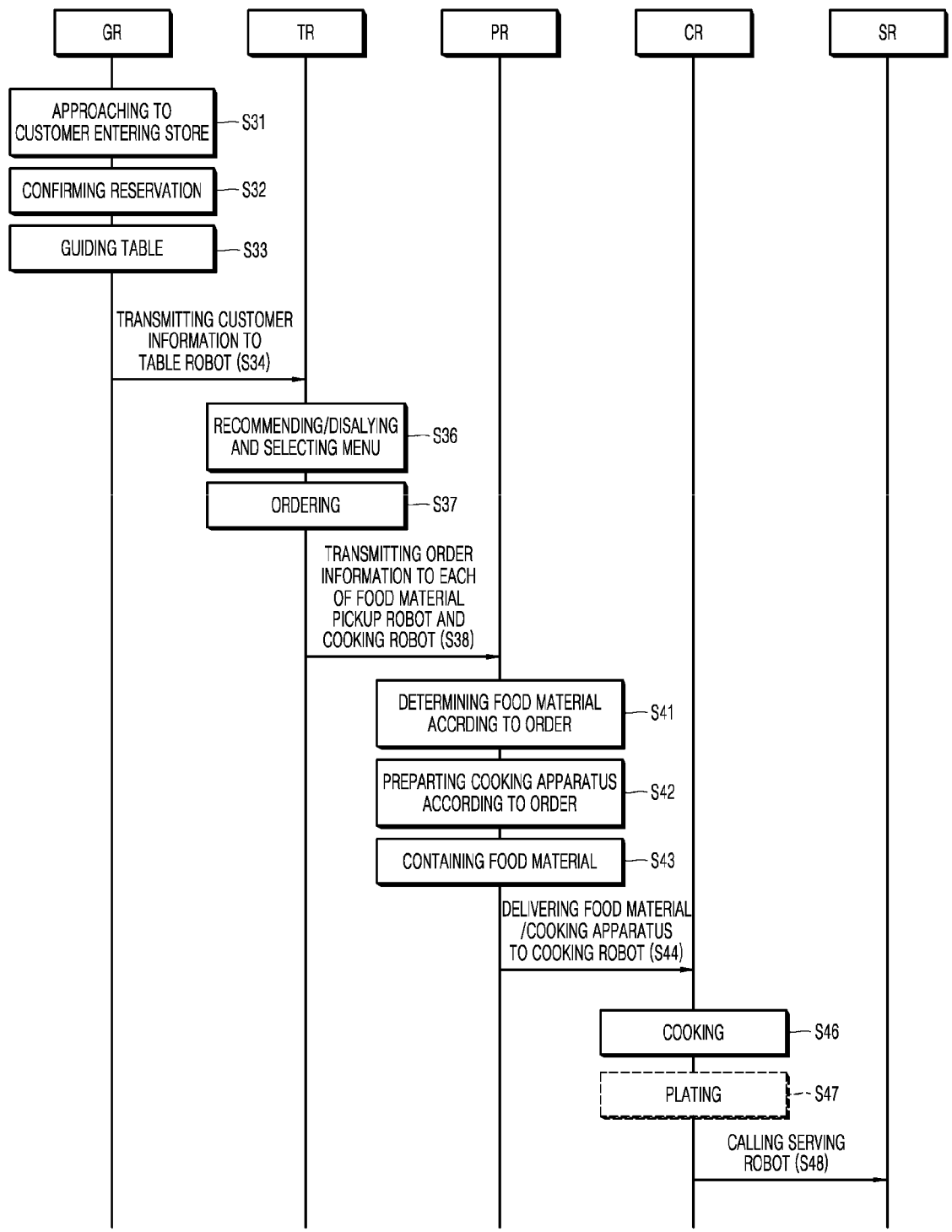
FIGS. 5 and 6 respectively show an example process of guiding customers and serving food to customers within a service area according to an embodiment of the present disclosure.
Figure 6:
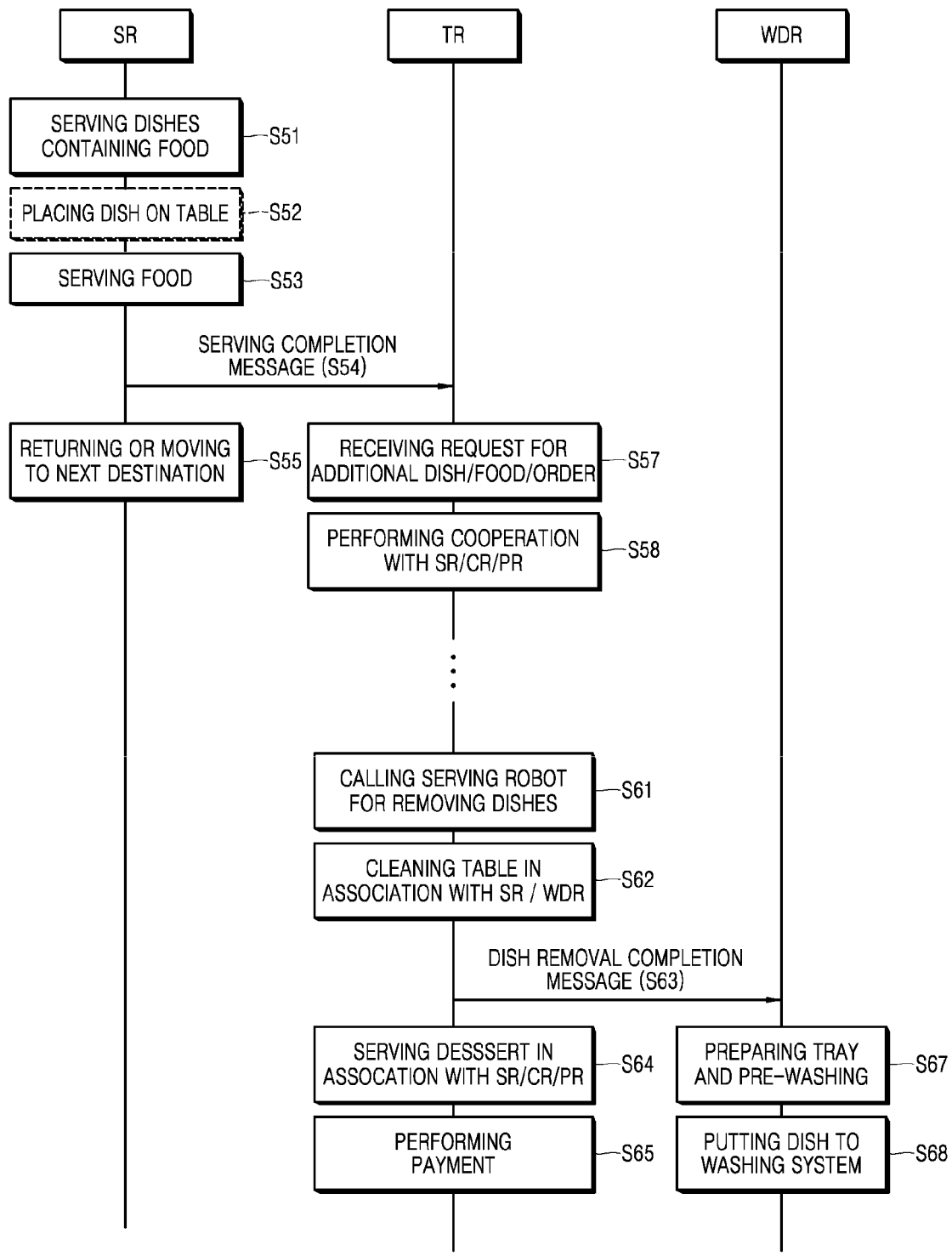

FIGS. 5 to 6 respectively show an example process of guiding customers and serving food to customers within a service area according to an embodiment of the present disclosure. The configurations are described with reference to FIGS. 5 and 6. In FIGS. 5 and 6, various types of communication schemes exemplified in FIGS. 1 to 4 may be used. For example, direct communication between the robots in FIGS. 5 and 6 includes an example of the communication scheme among the robots via the control server.

A guide robot GR approaches to a customer who entering a service area 1, for example, a store (S31). The guide robot GR confirms reservation from the customer (S32). The guide robot GR generates table information on table used for the customer according to the confirmed reservation. Alternatively, if the customer does not make a reservation, the guide robot GR determines a number of visited customers and generates table information on table used for the customer. In addition, the guide robot GR guides the customer to a table corresponding to the table information (S33).

Characteristics of the customers may be used during the guidance. The guide robot GR guides a family customer including children or the elderly to a family table. The guide robot GR guides company's dinner customers to a dinner table.

Reservation confirmation may be performed based on name/reservation number. The guide robot GR may guide the customers to the table and may output a guide speech suitable for the situation. Alternatively, the guide robot GR may output the guide speech indicating that the table robot TR may take an order.

The guide robot GR transmits customer information to the table robot TR (S34). The customer information includes information used to provide service to customers within the service area 1, such as time information on a time when a customer visits the store, a number of customers, customer member information (e.g., ages and presence or absence of the elderly/children), and purpose of reservations (e.g., dinners, family meals, and events).

Further, the table robot TR may receive, from the guide robot GR, arrival information on arrival of the customer at the table.

In addition, the guide robot GR and the table robot TR may each output a message informing that the guide robot GR and the table robot TR guided the customer to the table and a customer welcome message (e.g., a welcome message) through voice or based on visual information. Alternatively, the guide robot GR and the table robot TR may each output voice interactively and provide a human interface such that customers seat on the table to enjoy the meal.

The table robot TR may generate recommendation menu information based on the customer information previously received from the guide robot. For example, the table robot TR recommends or displays a menu to the customers, or receives the selected menu item information from the customers (S36). The table robot TR receives the menu item information on menu item selected from the user through a predetermined mounted display or voice recognition.

The table robot TR takes an order (S37). The table robot TR may perform payment immediately after taking an order. Alternatively, the table robot TR may perform the payment after the customer finishes meal.

The table robot TR transmits order information to each of the food material pickup robot PR and the cooking robot CR (S38). The food material pickup robot PR identifies food materials according to the order (S41) and prepares cooking apparatuses used for cooking according to the order (S42). Cooking apparatuses include dishes, pots, frying pans, and so forth. Subsequently, the food material pickup robot PR puts the food materials into the cooking apparatus (S43).

Subsequently, the food material pickup robot PR delivers the food materials and the cooking apparatus to the cooking robot CR (S44).

Subsequently, the cooking robot CR performs cooking (S46) and performs plating (S47). Robot may perform plating by disposing food on the dishes. The cooking robot CR may directly perform the plating or a person may perform the plating on an additional dish after receiving the food prepared by the cooking robot CR. The cooking robot CR calls a serving robot (S48).

In some examples where the cooking robot CR cooks noodles, when vegetables or meats are selected to be put into the noodles according to the previous order, the food material pickup robot PR may pick up the corresponding vegetables or meat. The cooking robot CR may boil thin noodles according to the order and may prepare the noodles with the provided food materials.

The serving robot SR serves a dish containing food to the table (S51). A driving speed of the serving robot SR may vary depending on types of food. For example, the serving robot SR reduces the driving speed to deliver liquid food. In some cases where the serving robot SR serves solid food, for example, cakes or breads, the serving robot SR may increase the driving speed thereof.

For example, the serving robot SR may receive serving food type information from the cooking robot CR or the control server 500 or may receive, from the table robot TR, the food type information combined with the order identification information generated during the ordering. Alternatively, the serving robot SR may analyze an image of provided food to obtain the food type information. The serving robot SR may also determine the driving speed suitable for the types of food.

In some cases where the serving robot SR may move to a plurality of target tables, the serving robot SR may arrange destinations to generate a shortest path. Alternatively, the serving robot SR may generate a driving route by determining a firstly serving table among the plurality of tables. Alternatively, the serving robot SR may generate the driving route according to an order sequence or a calling sequence.

In addition, the serving robot SR may detect surrounding objects during movement and may move while avoiding obstacles. When the serving robot SR moves with an employee, the serving robot SR may move while following the employee.

The serving robot SR may move to the table autonomously or with an employee within the service area. In this case, the serving robot SR may follow a tag carried by the employee.

Alternatively, when the serving robot SR autonomously moves to the first table, the serving robot SR may transmit a message instructing the employee to move to the first table and serve the food to a communication device carried by the employee. In this case, the serving robot SR may transmit a time point at which it arrives at the first table to the communication device carried by the employee such that the employee arrives at the first table at that time point.

Subsequently, the serving robot SR arrived at the table places the dishes on the table (S52). In this process, the serving robot SR may cooperate with a person. In some examples where the serving robot SR with a plurality of stored dishes to be delivered onto a plurality of tables moves and arrives at the first table, the serving robot SR only takes out serving dishes to an outside of the serving robot SR to place the serving dishes on the first table.

When an additional dish transporter is coupled to the serving robot SR, the serving robot SR directly places the dishes on the first table. Alternatively, if the person is cooperated with the serving robot SR, the dishes are taken out to an outside of the serving robot SR such that the dishes are easily delivered to the person.

The serving robot SR transmits a serving completion message to the table robot TR (S54). Subsequently, the serving robot SR returns to a standby position or moves to a next table (S55).

In some examples, the table robot TR may output various pieces of information or output music at a table to place the food. For example, the table robot TR may respond to a customer's question about food. In some cases where the customer asks the table robot TR about the origin of the noodles while having noodles, the table robot TR may output noodle origin information through a voice speaker or a display window.

In addition, the table robot TR takes additional orders or receives additional requests from customers (S57). For example, the table robot TR may receive requests for adding side dishes or new dishes, or additionally ordering other food. For example, the table robot TR provides a customized table service to the customer seated at the table. In addition, the table robot TR may cooperate with the SR/the CR/the PR to repeat the processes of S31 to S53 for the additional requests (S58).

Accordingly, the table robot TR may explain details of food provided on the table or monitor a speed at which food is removed from the dishes.

Alternatively, the table robot TR monitors an emergency occurring at the table or the table robot TR may transmit input order information on order placed by the customer through voice at the table to the control server or the serving robot SR, or the cooking robot CR.

When the customer finishes the meal, the table robot TR directly determines returning of dishes on the table or calls the serving robot to return the dishes according to customer's requests. The table robot TR cleans the table in association with the serving robot and the dishwashing robot and transmits a dish removal completion message to the dishwashing robot WDR (S62 and S63).

As a specific example of cleaning the table, the serving robot SR may accommodate the dishes returned from the table and may deliver the dishes to the dishwashing robot WDR. The dishwashing robot WDR may clean all dishes or wash some of the dishes.

For example, the table robot TR may notify the dishwashing robot of dishes for washing such that the dishwashing robot WDR is ready for washing dishes before the dishes arrive.

In addition, the table robot TR may serve dessert in cooperation with the SR/CR/PR to repeat the processes of S31 to S53 (S64). In this process, the barista robot BR may prepare beverages such as coffee. Subsequently, the table robot TR performs the payment (S65).

According to another embodiment, the guide robot GR may perform the payment instead of the table robot TR when the customer goes to an outside of the store.

In some examples, the dishwashing robot WDR prepares a tray for washing dishes in response to the message at S63, pre-washes the dishes (S67), and then puts the dishes into a washing system (S68). In this process, the dishwashing robot WDR may clean and wash dishes containing food with a lot of orders.

In FIG. 6, when the food material pickup robot PR prepares the food materials and the cooking robot CR cooks, the control server 500 or the food material pickup robot PR/the cooking robot CR may autonomously determine the cooking sequence based on the cooking time and the serving sequence of the foods.

In some cases where 10 minutes take to prepare first food and 40 minutes take to prepare second food, where the first food and the second food are each ordered by the customer at the first table, and 20 minutes take to prepare first food ordered by the customer at the second table, the food material pickup robot PR/the cooking robot CR cooks the first food ordered by the customer at a second table and the second food ordered by the customer at the first table, and when the first food ordered by the customer at the second table is completed, the food material pickup robot PR/cooking robot CR may cook the first food ordered by the customer at the first table.

Similarly, if the same types of five foods are ordered from several tables and the foods are served independently, the food material pickup robot PR/the cooking robot CR may cook five foods and divide them into five plates.

For example, the control server 500 or the food material pickup robot PR/the cooking robot CR may change the cooking sequence or a cooking method based on a cooking time period for which the ordered food is cooked, a time point at which the ordered food is served, a number of foods for each table, and types of foods.

S47 indicated by dotted lines in FIGS. 5 and S52 indicated by dotted lines in FIG. 6 may be performed by the person and the robot in cooperation.

In addition, during the processes of FIGS. 5 and 6, the table robot TR or a camera installed on the ceiling above the table may monitor the table and provide customized service based on table information through vision recognition.

For example, at S36, the table robot TR/the guide robot GR/the ceiling camera disposed around the table provide a voice agent service to recommend a menu based on voice interaction and to request the serving robot SR to provide needed tableware.

In addition, when the customer waits for food after ordering, the table robot TR may display a waiting time until the food is served or may notify a cooking process through voice, or may relay the cooking image captured by the cooking robot CR.

During delivery of the food served on the table, by the serving robot SR, the serving robot SR may also notify whether the food is delivered from at least one of shelves to at least one of positions on the table. For example, the serving robot SR may guide the positions of the tables from which orders was received by customers to the employee or the customer. Further, a display of the table robot TR may function as a serving spotlight in association with the ceiling camera and a lamp.

During the meal, the table robot TR may notify food information. For example, the table robot TR may notify food or food materials.

The table robot TR may also monitor the dishes on the table to clean the finished dishes, replace the tableware, or determine refill of drinks and to deliver requests to the serving robot or the guide robot.

In addition, the table robot TR generates big data by tracking an intake rate of customers for each menu item such that the control server 500 may predict a table turnover rate within the service area to determine an exact waiting time based on the accumulated information.

In some cases where the dishes are empty or the customer does not have a meal for a certain time period, the table robot TR determines a state of the serving robot that performs the removal of dishes and determines the call.

The table robot TR may capture serving food with a top view. The table robot TR sends the captured image to a customer's email such that the customers may upload the received image on a social network service (SNS). The table robot TR may capture a bright picture by controlling the lamp on the ceiling, such as a flash. In the other example, the TR sends the captured image to the customer's phone using direct communication protocol like Bluetooth, and so forth.

The table robot TR may analyze people's meal patterns for the menu and may accumulate information on favorite food materials and an eating sequence. The control server 500 may use the information accumulated by the table robot RB to develop or modify menus.

In addition, the table robot TR may monitor the meal situation or the serving robot may move to remove finished dishes according to instructions or requests from customers. A meal finish time may be estimated based on the meal time information accumulated for each menu, voice/conversation recognition, and determination of a leftover food state using the camera. The table robot TR may inquire the removal of dishes of customers through voice.

In some cases where the service area 1 is a pub or a place where a lot of dinners are served or a place where customers interact with one another, the table robot TR captures the table in charge of itself and transmits the captured image to another table robot TR, or may relay the captured image through a large display within the service area 1. In this case, customers may solve curiosities about food ordered by other people and may determine popular menus to easily place an order in a restaurant where the customers visits for the first time.

The detailed operation of each of the robots is described below in detail.

Figure 7:
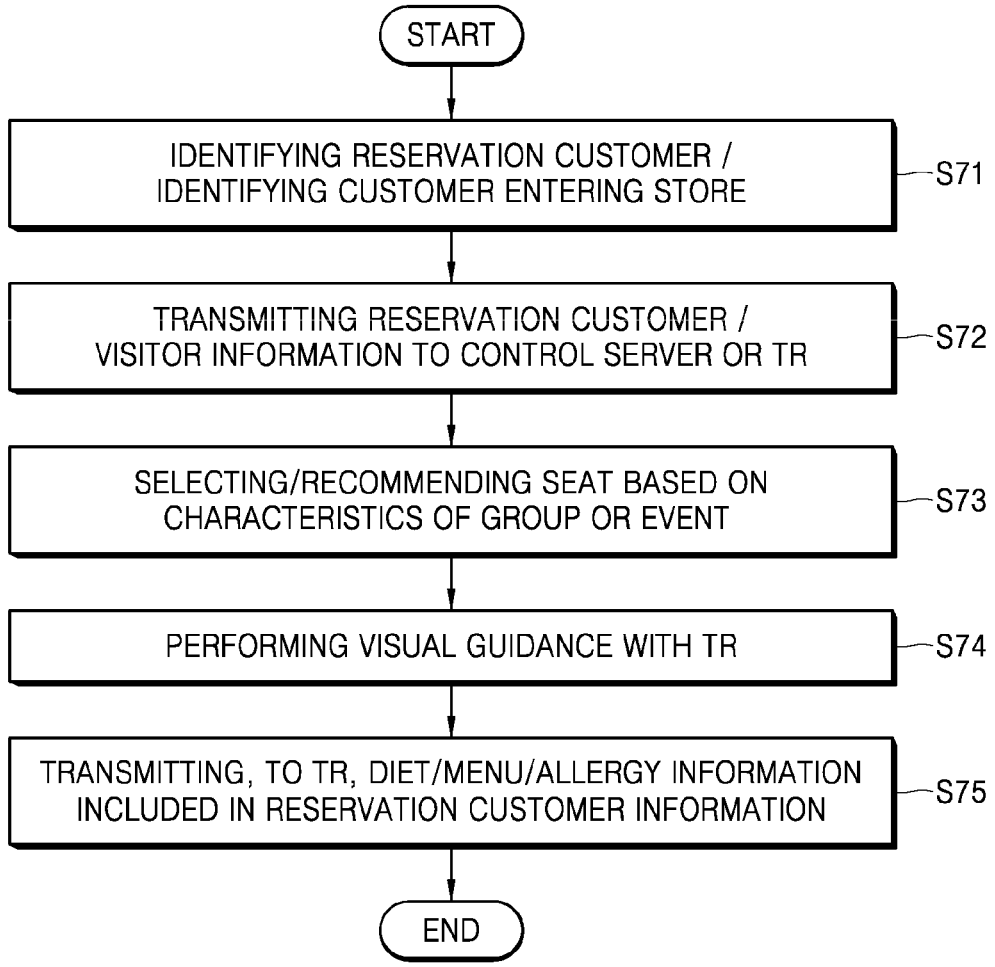
FIG. 7 shows example operation of each of a guide robot and a table robot according to an embodiment of the present disclosure.

FIG. 7 shows example operations of a guide robot and a table robot according to an embodiment of the present disclosure. The guide robot waits for customers at an entrance. When the customer enters, a guide robot GR may recognize the customer's face or smart phones or customer's cards carried by the customers, or may receive reservation number information from the customers.

For example, the guide robot GR identifies a reservation customer based on FaceID or the guide robot GR determines that the customer has entered within a service area 1 using a geo-fence (S71).

The guide robot GR may identify the reservation customers or visitors and may transmit the reservation customer/visitor information to a control server or a table robot TR in a restaurant. (S72). The guide robot GR also enables accumulation of points and payment by linking accounts of the reservation customers or the visitors.

In this case, the guide robot GR may enter the name and the phone numbers only to a display window to prevent exposure of personal information of the reservation customer or may output the name and the phone numbers only through the display for determination. Alternatively, the guide robot GR may output the name and the phone number with small voice only when the customer is close to the guide robot GR and the customers may respond with "yes/no".

Alternatively, the guide robot GR may obtain personal information of the customer through voice or face recognition or tagging of the customer card. In this case, the customer may check the reservation state without telling the personal information.

The guide robot GR may also select and recommend seats (or tables) based information, for example, characteristics of group or events information (S73).

In one embodiment, the guide robot GR may match a group of visiting customers to a group of reservation customers even if some of the visiting customers are only arrived. The guide robot GR may also determine the group of customers to be suitable for properties of seats (or tables) to guide the customers to the seats (or the tables). For example, the guide robot GR may automatically select or recommend the tables or the seats based on characteristics of customers belonging to a group of customers, for example, customers who need assistance (e.g., the senior, the disabled, and infants) and may automatically select or recommend the tables or the seats for specific events (e.g., birthday or anniversary) (S73).

In addition, the guide robot GR may designate a seat based on a reservation state, a number of visiting customers, and a number of expected customers to select the seats for the customers. The guide robot GR may correspond event/seat request information included in reservation information, such as date/anniversary/window seat, to seat information on seat within the service area 1 and may guide the customer based on the information.

During the guidance, the guide robot GR may communicate with the table robot TR and perform visual guidance (S74). For example, if the guide robot GR is adjacent to the selected table, the table robot TR may output a customer welcoming message. Alternatively, the guide robot GR sends an arrival message to the table robot TR when the customer comes closer and the table robot TR outputs a message ("Please, come this way") to the guide robot GR, such that the guide robot GR and the table robot TR may provide a human interface through cooperation to guide the seats to the customers.

The guide robot GR enables the customers to pay by themselves based on the point accumulation/payment information of some of the reservation customers or enables the payment to be automatically performed based on additional virtual accounts, bank accounts, and card information.

The guide robot GR also transmits diet or allergy information included in the reservation information to the table robot TR such that the diet, preferred menu or allergy information may be used to select the food from the menu (S75).

The guide robot GR may guide a waiting time to a customer who visits a store or a customer who takes out food and the guide robot GR may directly take an order. In this case, the guide robot GR may include an ordering system to instruct other robots to complete the order/take-out order/delivery order in the store.

The guide robot GR or the table robot TR may also store a log record for recommending a menu when the customer revisits to the store, if the customer leaves the store. This information may be accumulated in the order system of the guide robot GR or transmitted to the control server 500.

In this case, when the customer revisits, the guide robot GR or the table robot TR may notify the past menu item to the customer and may suggest the selection of new menu items or preferred menu items. The guide robot GR or the table robot TR, or the control server 500 may accumulatively store customer specification information such as allergies.

The flow of FIG. 7 is summarized below. The guide robot may identify the reservation customer by recognizing face of customer entering the service area 1 (i.e., through face recognition) or tagging information of customer (i.e., tagging information), or personal information input by customers. The guide robot GR may also select a table to be seated by the customer based on the customer member information or reservation information input by customers and may guide the customers to the selected table.

When an order is taken in the process of FIG. 7, a cooking process is performed according to the order. The control server 500 may control the food material pickup robot PR and the cooking robot CR to predetermine a cooking sequence.

Figure 8:
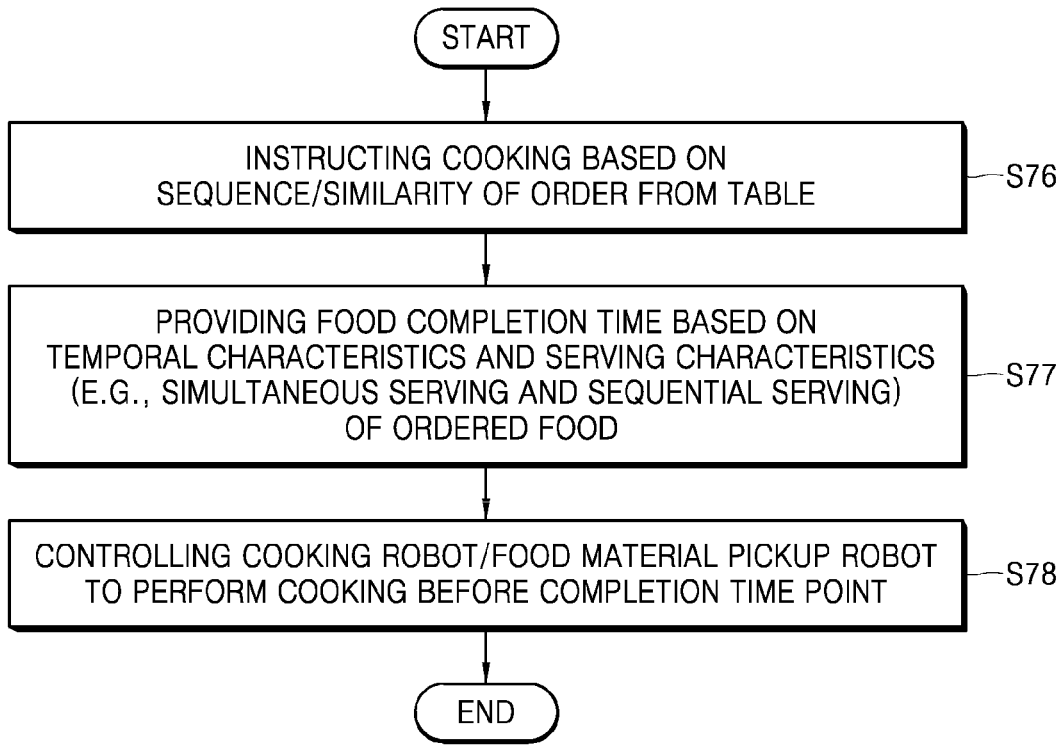
FIG. 8 shows an example process of controlling, by a control server, robots by determining a cooking sequence according to an embodiment of the present disclosure.

FIG. 8 shows an example process in which a control server controls robots to determine a cooking sequence and controls robots according to an embodiment of the present disclosure. The flow of FIG. 8 shows a process in which the control server collects order information on orders received from tables and determines an efficient cooking sequence. The flow of FIG. 8 may be performed by the food material pickup robot PR or the cooking robot CR as well as the control server. In this case, a first robot of the food material pickup robot PR or the cooking robot CR operates as a main robot to instruct a second robot to perform tasks.

The control server 500 instructs cooking based on a sequence/similarity among orders placed from tables (S76). The control server may instruct each of the food material pickup robot PR and the cooking robot CR to perform the operation.

In more detail, the control server 500 may instruct the food material pickup robot PR and the cooking robot CR to operate sequentially according to the sequence of orders. When similar foods are ordered from a plurality of tables, the control server 500 may control the food material pickup robot PR to pick up the food materials and may control the cooking robot CR to cook food.

When a plurality of same foods are ordered from the menu, for example, food of which states are changed over time after cooking, such as noodles, the control server 500 controls the cooking robot CR to pour soup to all of the dishes such that the previously cooked food is not cooled down (e.g., such that the noodles are not mushy).

The robots may perform an automatic motion control within a range that does not collide with one another even if the robots are communicatively and temporarily disconnected from the control server 500. For example, a cooking arm of the cooking robot CR to cook may be moved inward or operation thereof may be changed to be stopped.

The control server 500 transmits predetermined task instruction information to the food material pickup robot PR and the cooking robot CR such that the food material pickup robot PR and the cooking robot CR are autonomously operated even if the communication with the control server 500 is disconnected for a certain period of time.

The control server 500 may also recommend or suggest preferred menu items and food material inventory management to business owners based on log information generated during cooking.

The control server 500 may also provide a time point at which the food is completed based on temporal characteristics and serving characteristics (e.g., simultaneous serving and sequential serving) of the ordered food (S77). For example, the control server 500 may efficiently control the cooking robot CR by determining a number of orders and recipe information of food and grouping similar cooking steps. The control server 500 may also automatically select a position of food in the serving robot SR according to a movement line. The temporal characteristics of the ordered food contain temporal properties for preparing or cooking the ordered food. The serving characteristics contain serving properties for transferring time or speed for moving the ordered food to the table.

The control server 500 may also control the cooking robot/the food material pickup robot to finish cooking before a completion time point (S78). When multiple menu items are ordered at the same time, the control server 500 may automatically adjust a speed of the food material pickup robot based on a timing of the food material pickup and may automatically adjust a speed of cooking robot based on a cooking timing such that the food material pickup robot and the cooking robot, which operate together, efficiently cook the ordered menu items. For example, if the cooking robot performs several cooking steps or it takes a long time to cook, the food material pickup robot may operate slower than an actual speed.

In examples of FIGS. 1, 2 and 8, the food material pickup robot PR may contain, to a cooking dish, the food materials used to perform the cooking by the cooking robot CR based on the cooking instruction information and may deliver the cooking dish to the cooking robot.

The control server 500 may generate the cooking instruction information based on the sequence or the similarity between the foods ordered from the plurality of tables disposed within the service area 1 and a food completion time determined using temporal characteristics or serving characteristics of the ordered menu items.

The control server 500 may also transmit the cooking instruction information to each of the food material pickup robot and the cooking robot.

Alternatively, at least one of the food material pickup robot PR or the cooking robot CR may generate the information provided by the control server 500. This configuration is described with reference to FIG. 12.

Figure 9:
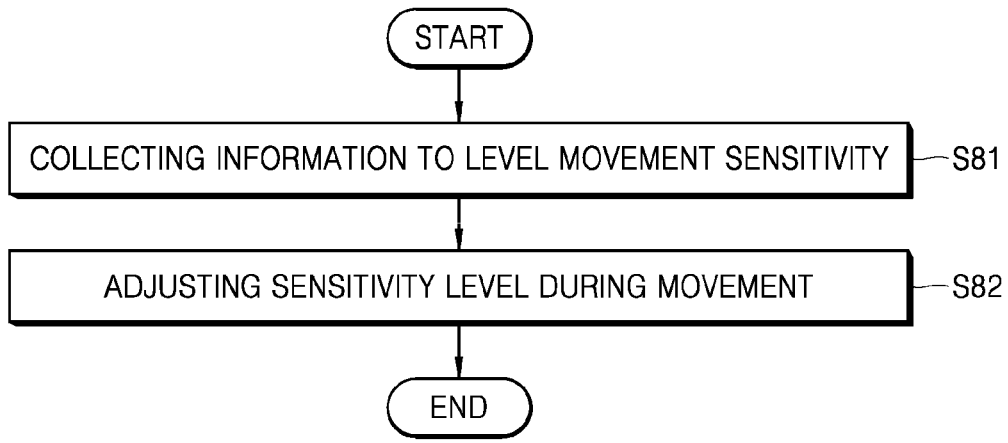
FIG. 9 shows an example process of serving by a serving robot in detail according to an embodiment of the present disclosure.

FIG. 9 shows an example process of serving by a serving robot in detail according to an embodiment of the present disclosure. The serving robot may adjust a moving speed, a rotation speed, or an obstacle detection speed based on characteristics of serving food, table information, and characteristics of a serving space (e.g., complexity information on complexity within a service area).

In one embodiment, the control server 500 may transmit characteristics of serving food, table information, and complexity information on complexity within the service area and the serving robot may determine a level of movement sensitivity during serving based on the characteristics of serving food, the table information, and the complexity information on complexity within the service area.

For example, the serving robot SR may detect the floor and a surrounding environment according to serving objects and may adjust a movement/rotation speed such that the serving robot safely serves the food to prevent a risk of spilling food depending on the speed/floor condition when the serving robot SR moves while carrying the food.

The serving robot SR collects information on serving objects (e.g., food, dish type, and the like), paths, and complexity within the service area 1 to level the movement sensitivity (S81). The serving robot SR may also adjust the sensitivity level according to the surrounding situation or the serving completion state while moving based on the leveled movement sensitivity (S82).

For example, the table robot to take an order through communication with customers may perform synchronization with the serving robot via the control server 500 to level the movement sensitivity. Specific dishes may be designated for each menu item and the serving robot SR may determine the properties of serving objects through a quick response (QR) code at a lower end of the dishes and magnetism.

Alternatively, the serving robot SR may level the movement sensitivity based on determination of contained food by lighting, by a camera, disposed on a bottom surface of a shelf toward a lower portion thereof.

The serving robot SR may collect the following information to level the movement sensitivity. For example, the serving robot SR may determine an amount of liquid (e.g., soup and drink) of the serving food and whether sophisticated plating is needed to level the movement sensitivity based on the determination.

The serving robot SR may also collect floor characteristics information. For example, the serving robot SR may level the movement sensitivity based on smoothness of the floor surface or presence or absence of obstacles.

The serving robot SR may also level the movement sensitivity according to characteristics of the surrounding environment, for example, a lot of movements of people and movements of other robots.

The serving robot SR also increases the sensitivity level when the cooked food is placed on the shelf and may adjust the speed based on the sensitivity level or further reduces the speed according to a state of the floor (e.g., a sloped state and presence or absence of obstacles) or may perform avoiding operation.

The serving robot SR may support a function for heating/cooling the shelf to maintain a temperature of the food according to the types of foods placed on the shelf of the serving robot. The serving robot SR may also determine a dedicated tray area to place dishes containing liquid and may mount a suspension at a tray supporting portion to automatically adjust shock absorption according to types of serving foods.

In addition, the serving robot SR may control the level of movement sensitivity when all liquid food is served and only solid food is placed on the tray. For example, the serving robot may quickly move than before after the food easy to spill is served, to improve efficiency of serving.

Therefore, a moving speed of the serving robot SR at the time of initial start may be different from a moving speed after serving the food.

In addition, indications are disposed on the floor or the ceiling within the service area 1, are detected by the serving robot SR for safe movement of the serving robot SR, and the serving robot SR may move while following indications.

Figure 10:
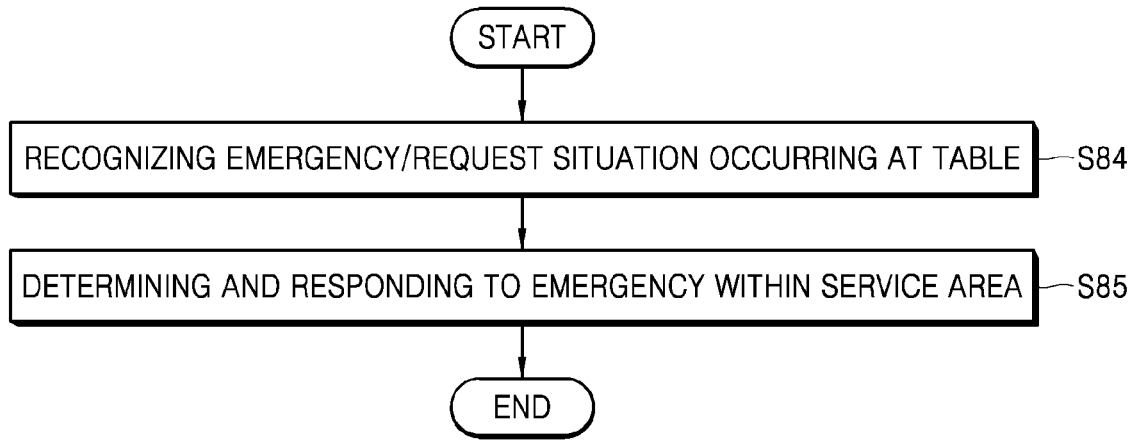
FIG. 10 shows an example process of providing service based on context recognition of robots moving within a service area according to an embodiment of the present disclosure.

FIG. 10 shows an example process of providing service based on context awareness of robots driving within a service area according to an embodiment of the present disclosure.

A guide robot GR and a serving robot SR are examples of a driving robot and the robots may move within the service area. Therefore, the robots may determine and respond to situations of customers or employees during the movement.

The situation includes an emergency situation or a customer demand situation and the guide robot GR or the serving robot SR may store a context defined for each situation and responding operation. The guide robot GR or the serving robot SR may also respond to the specific situation.

In one embodiment, when the customer makes a call during the meal at the table, the guide robot GR or the serving robot SR may recognize an emergency situation, such as a situation where water or food is spilled (S84) and may respond to the emergency situation (S85).

To this end, the table robot TR may analyze the customer's motion and voice on the table. In addition, the guide robot GR or the serving robot SR may output a greeting speech to improve intimacy between the customer and the robot when the guide robot GR or the serving robot SR meets the customers during movement.

In particular, when the robot meets the child within the service area 1, the guide robot GR or the serving robot SR may output an interesting image or interesting sound to interact with the children.

In addition, the guide robot GR or the serving robot SR may determine and respond to a dangerous situation within the service area (S85). The guide robot GR or the serving robot SR may perform a security function when the dishes are broken within the service area or after the restaurant within the service area is closed.

The guide robot GR or the serving robot SR performs security tasks such as fire prevention, gas leak detection, and crime prevention, and even if there are no people within the service area 1, the robots may control air conditioning or a temperature in the space in association with smart products.

In addition, when the robot determines the call of the customers at S84, the control server 500 may control the guide robot or the serving robot (that removes finished dishes or serves the food) to suitably move according to properties of calls or user's requests. Alternatively, the guide robot GR may control the movement of other robots instead of the control server 500 or each of the robots may autonomously move based on a distance between the robot and a called table.

In some cases where a specific robot is called within a service area where several driving robots (e.g., GR/SR) move at the same time or where a function of a specific robot is needed, each robot or the control server may calculate an optimal path. The robot moves along the calculated path.

In this case, when each robot or the control server 500 generates an optimal path, each robot or the control server 500 may generate a route based on a situation or a requested task and may reset the route based on determination of priorities. The robot or the control server 500 determines the movement or the tasks in real time without management of employees during movement of the robot as exemplified in S84.

In addition, the robot may determine priorities between the robots to efficiently drive and prevent collision accidents or reset a route according to tasks performed by the robots.

Figure 11:
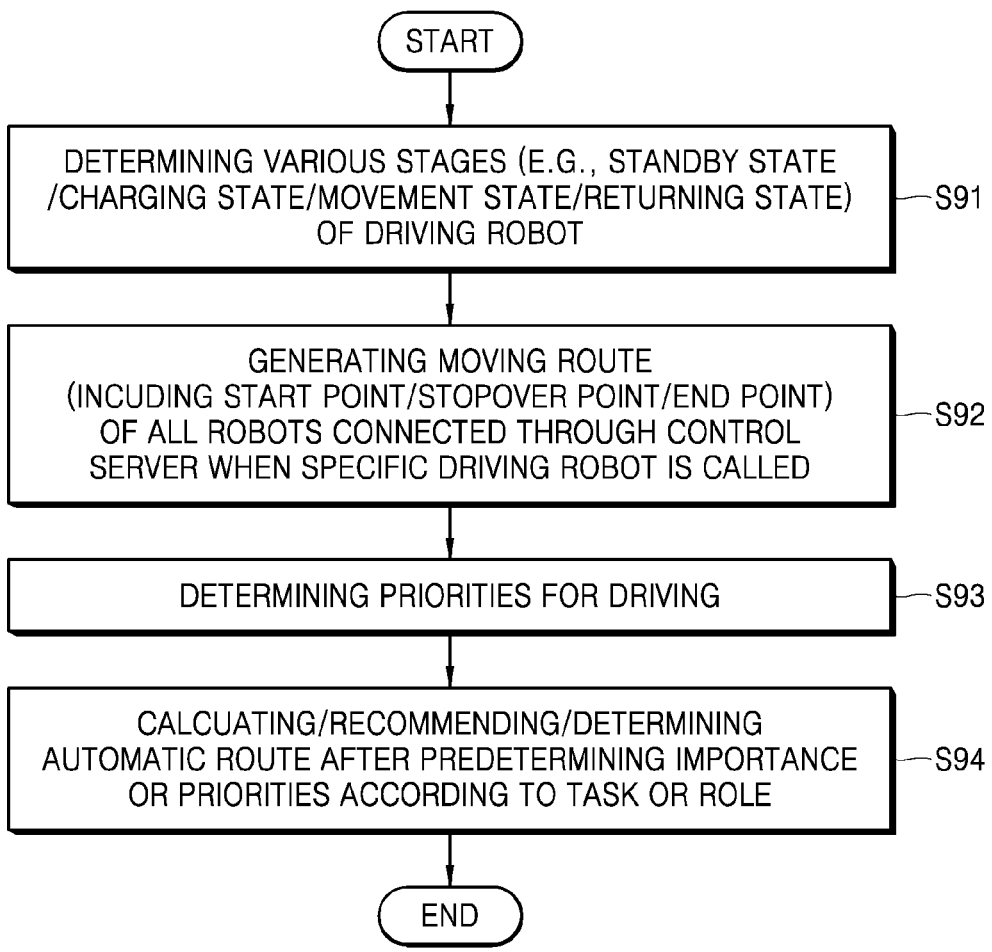
FIG. 11 shows an example determination process for optimizing a route during movement of moving robots according to an embodiment of the present disclosure.

FIG. 11 shows an example process of determining for optimizing a route during movement of driving robots according to an embodiment of the present disclosure.

A main robot or a control server 500, among robots, or each robot autonomously determines various states of driving robots (e.g., a standby state/a charging state/a movement state/a return state, and the like) (S91). Each of the robots transmit the information to the control server 500 or transmit the information to other robots through broadcasting.

In addition, when a specific driving robot is called, a movement route (including a start point/a stopover point (waypoint)/an end point) of each of robots connected through the control server is generated (S92). In this process, the robots may autonomously generate the movement paths and share the generated movement paths between the main robot and each of the robots, without a control server.

Subsequently, the driving priorities are determined based on the generated movement route of each robot (S93). The driving priorities may be determined based on call of each of the robots or a possibility of collision among the robots when the robots move along the movement path, or types of objects (e.g., food or tableware) served by the robot.

The control server 500 or the main robot, or each of the robots determines importance and priorities based on the autonomous determination. For example, after the importance and priority are determined in advance according to tasks or roles, an automatic route may be calculated, recommended, or determined (S94).

In some examples where the serving robot is called at the same time, the serving robot or the control server 500 determines the called task and determines the priorities of the calls. The serving robot or the control server 500 generates a route to perform a lot of tasks.

In addition, when a new call occurs during the movement of the serving robot and the call is made from the table disposed in the path, the serving robot may move to the table at which the customer makes new call. In some cases where the serving robot moves from table A to table D to perform the task, if customers make a call at table B and the table B is disposed in a route toward the table D, the serving robot may move via the table B as a waypoint to perform the task.

The control server 500 or a main serving robot among the plurality of serving robots may assign tasks to each serving robot according to priorities/positions/states of the plurality of serving robots.

In addition, the control server 500 or the main robot may distribute the tasks after calculating a time period for which the table is used to efficiently operate the robots at a peak time.

Figure 12:
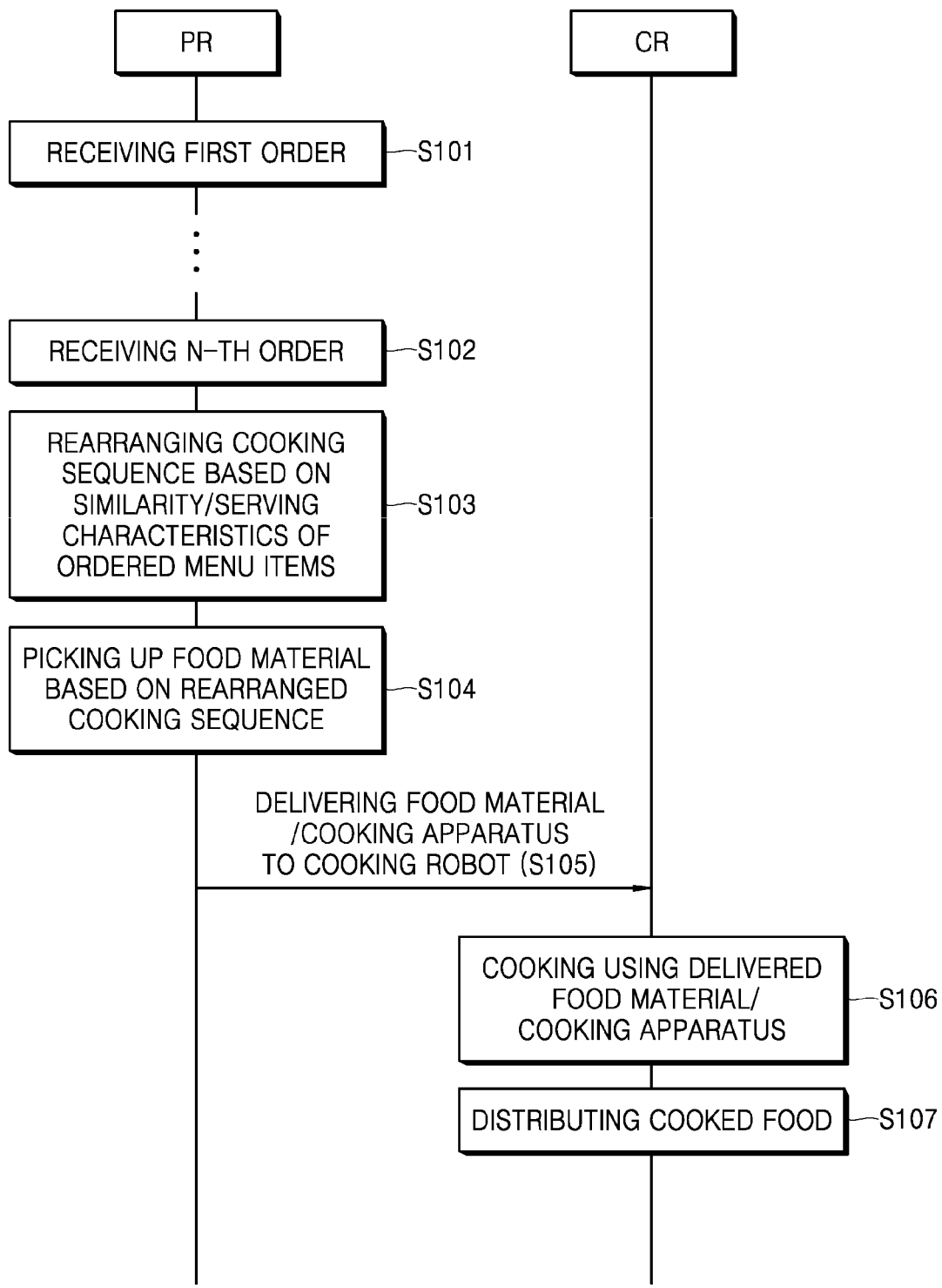
FIGS. 12 and 13 respectively show an example process of determining, by a cooking robot and a food material pickup robot, a task sequence of a plurality of orders according to an embodiment of the present disclosure.
Figure 13:
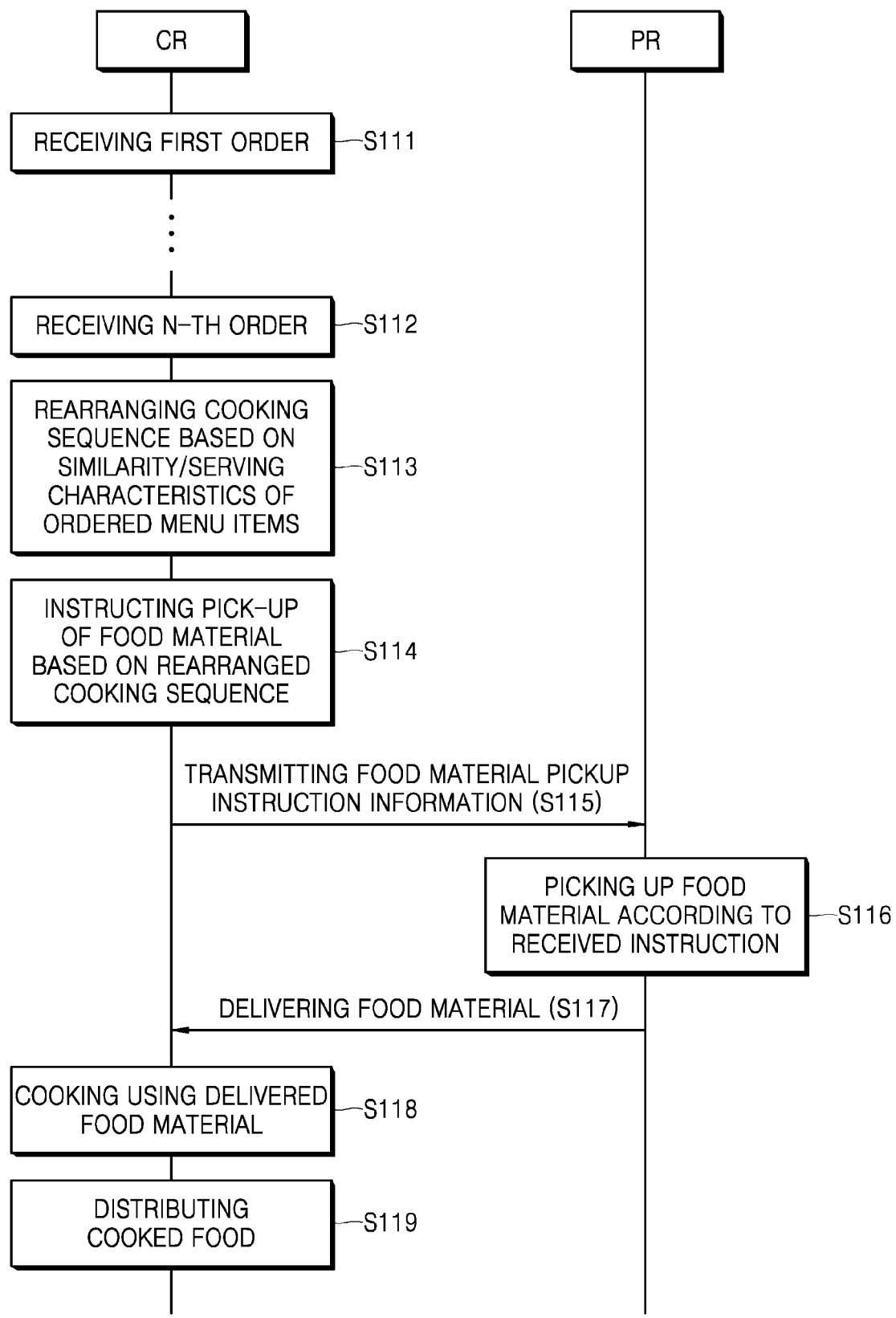

FIGS. 12 and 13 respectively show an example process of determining a task sequence by a cooking robot and a food material pickup robot when a lot of orders are received according to an embodiment of the present disclosure. A first main robot among the cooking robot or the food material pickup robot may instruct a second robot to perform the task.

FIG. 12 shows an example main food material pickup robot. FIG. 13 shows an example main cooking robot.

In FIG. 12, a food material pickup robot PR receives N orders for a predetermined period of time (e.g., 1 minute, 3 minutes, or 5 minutes) (S101, S102). The food material pickup robot PR rearranges a cooking sequence based on similarity among ordered menu items/serving characteristics (S103) as a plurality of orders are received (S103).

In particular, when the same menu items are ordered from the multiple tables, the food material pickup robot PR may determine the sequence such that the food material pick up robot PR cooks the food based on a time point at which the foods are ordered from the menu and an expected serving time.

Subsequently, the food material pickup robot PR performs the food material pickup according to the rearranged cooking sequence (S104) and delivers the food materials to the cooking robot (S105). The cooking robot CR cooks using the delivered food materials/cooking devices (S106).

Subsequently, the cooking robot CR distributes the cooked food to a plurality of dishes (S107).

In some cases where the cooking robot CR cooks using a pot, the cooking robot CR may receive food materials for two persons from the food material pickup robot PR to cook. In some cases where at least two dishes are provided, the cooking robot CR may distribute the cooked food into the at least two dishes when the cooking is completed.

In FIG. 13, the cooking robot CR receives N orders for a predetermined time period (e.g., 1 minute, 3 minutes, or 5 minutes, and the like) (S111 and S112). As a plurality of orders have been received, the cooking robot CR rearranges the cooking order based on the similarity/serving characteristics of the order (S113). In particular, when the same food is ordered from a plurality of tables, the cooking robot PR may arrange the sequence such that the foods may be cooked based on a time point at which the order is received and an expected serving time.

Subsequently, the cooking robot CR instructs the pick-up of the food materials according to the rearranged cooking sequence (S114). The cooking robot CR transmits the food material pickup instruction information to the food material pickup robot PR (S115). The food material pickup robot PR picks up the food materials according to the received instructions and delivers the food materials to the cooking robot (S116 and S117).

The cooking robot CR cooks using the delivered food materials (S118). Subsequently, the cooking robot CR distributes the cooked food to a plurality of dishes (S119).

In some cases where the cooking robot CR cooks using the pot, the cooking robot CR may receive food materials for two persons from the food material pickup robot PR and cook. In this case, two or more dishes are provided and the cooking robot CR may distribute the cooked food to two or more dishes when cooking is completed.

FIGS. 12 and 13 respectively show a process in which any one robot arranges multiple orders. When the control server 500 is present, the control server may perform the order reception and rearrangement of the cooking sequence.

Figure 14:
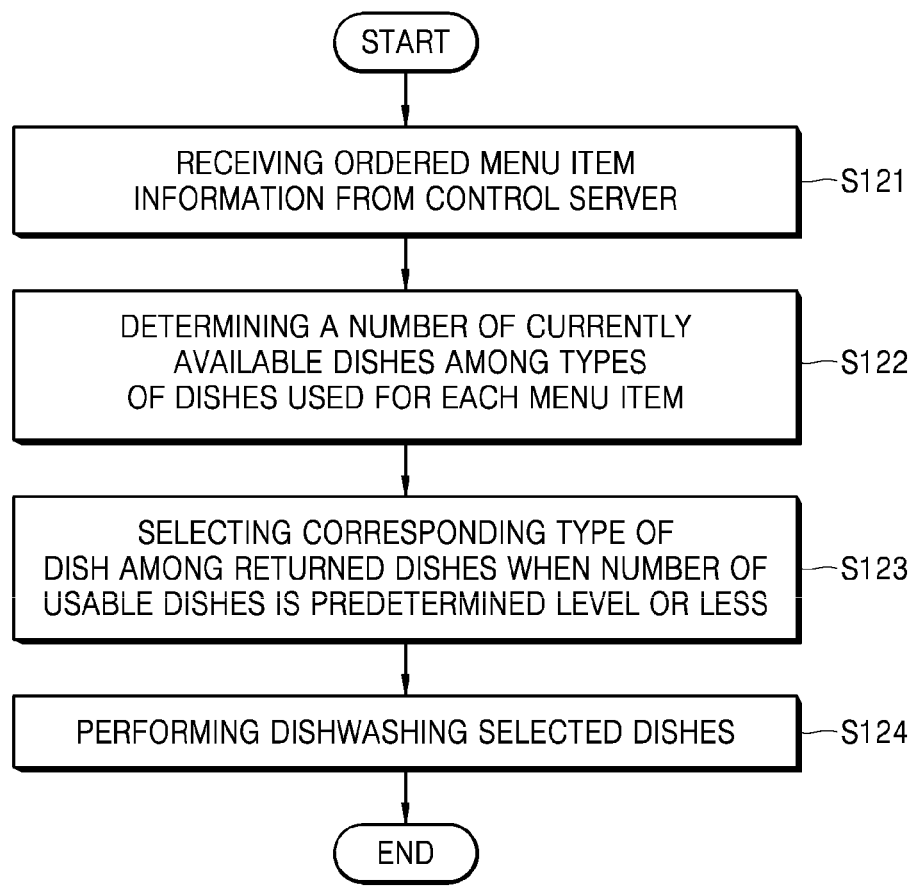
FIG. 14 shows a process of washing dishes by a dishwashing robot according to an embodiment of the present disclosure.

FIG. 14 shows an example process of washing dishes by a dishwashing robot according to an embodiment of the present disclosure. A dishwashing robot WDR may receive used dishes from the serving robot. Alternatively, the dishwashing robot WDR may receive dishes carried by a person.

The dishwashing robot WDR may wash dishes not based on additional temporal priorities after providing service to customers within the service area. In some cases where a number of customers enter the service area, dishes that need to be washed quickly may be selected according to a menu order state or types of dishes.

The dishwashing robot WDR may receive information on the dishes needed within the service area from the control server 500 and may determine priorities of washing dishes based on the received information. This configuration is described below in detail.

The dishwashing robot WDR receives the ordered menu item information from the control server 500 (S121). The dishwashing robot WDR determines a number of currently available dishes among dishes used for each menu item from the control server 500 or the food material pickup server PR (S122). In some cases where a plurality of ordered noodles are determined based on the currently received menu item information, the dishwashing robot WDR determines a number of available noodle dishes.

Subsequently, when a number of available dishes are provided at a predetermined level or less, the corresponding type of dish is selected among the returned dishes (S123). In some cases where 100 noodles are ordered and 110 noodle dishes are currently available, the noodle dishes may be insufficient when a subsequent noodle order is received.

The dishwashing robot WDR selects dishes to contain noodle among dishes delivered by the serving robot SR that removes finished dishes and washes the selected dishes (S124).

The selective/preferential washing operation may be performed based on the menu order situation within the service area 1. In some cases where 100 noodles are ordered and 110 noodle dishes are currently available, and ordering is finished within the service area 1, the dishwashing robot WDR may determine that the noodle dishes are not needed and may wash all the dishes.

In some examples where 10 noodles are ordered and 100 noodles may be ordered in 30 minutes according to the past order patterns, even if 80 noodle dishes are currently available, the dishwashing robot WDR may determine that noodle dishes are further needed and may wash the noodle dishes.

Figure 15:
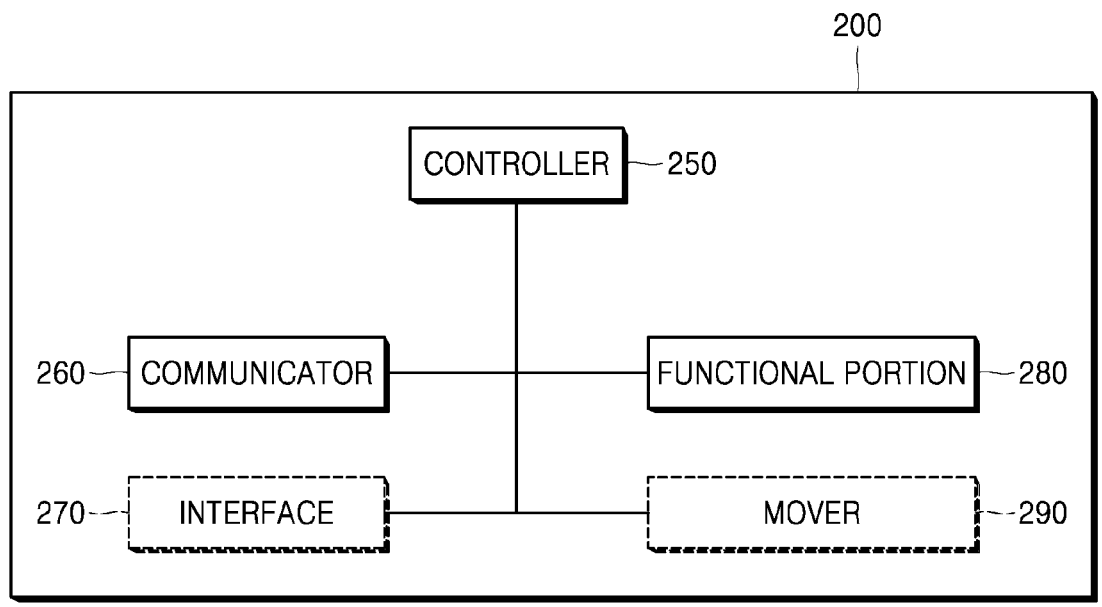
FIG. 15 shows an example robot according to an embodiment of the present disclosure.

FIG. 15 shows an example robot. The robots are classified according to functions of the robots. Common components of the robots are described below according to an embodiment of the present disclosure. A robot 200 includes a controller 250, a communicator 260, an interface 270, and a functional portion 280. In addition, the robot 200 may include a mover 290 according to types of the robot 200. The robot 200 may optionally include an interface 270 according to types of the robot 200.

The controller 250 of the robot 200 collects information used to control operation of the robot and instructs the robot to perform the operation based on the collected information. The controller 250 may be configured with hardware or software.

The communicator 260 allows a first robot to communicate with a second robot, among the robots, or allows the robot to communicate with the control server.

The interface 270 receives information from a user. The interface 270 receives various pieces of information such as touch input and voice input from a user and output results thereof. In particular, the guide robot GR and the table robot TR may provide various pieces of information to the user using the interface 270 or may monitor a current state or characteristics of the user.

The functional portion 280 performs a function specialized for the robot. For example, the serving robot SR may include a serving shelf. A cooking robot CR may include a functional portion 280 as a component for cooking. A food material pickup robot PR may include a component to store food materials. A dishwashing robot WDR may include a dishwashing component.

A mover 290 moves the robot. A guide robot GR and a serving robot SR may each include the mover 290. In addition, depending on the functions of some robots, the food material pickup robot PR, the cooking robot CR, and the dishwashing robot WDR may also perform a function while moving within a workshop, and in this case, the food material pickup robot PR, the cooking robot CR, and the dishwashing robot WDR may each include the mover 290.

The food material pickup robot PR, the cooking robot CR, and the dishwashing robot WDR may each include a functional portion 280 with a robot art to pick up or transmit far-away objects without the mover 290. In this case, each of the food material pickup robot PR, the cooking robot CR, and the dishwashing robot WDR may not include the mover 290.

In some cases where the robot in FIG. 15 is a cooking robot, each of components may operate as follows. A communicator 260 receives ordered menu item information from the control server to monitor a service area or a table robot disposed within the service area.

The controller 250 generates cooking instruction information based on the received information, a sequence or similarity among the orders received from a plurality of tables disposed within the service area, and a food completion time determined using temporal characteristics or serving characteristics of the ordered menu items.

In addition, the functional portion 280 performs a cooking operation based on the cooking instruction information. In this case, the functional portion 280 of the cooking robot performs a cooking function of roasting, warming, or boiling food.

In some cases where the cooking robot cooperates with the food material pickup robot, the functional portion 280 of the cooking robot may receive, from the food material pickup robot, a cooking dish containing food materials used to perform cooking.

When the robot in FIG. 15 is a serving robot, each of components may operate as follows. The serving robot moves objects and may deliver a dish containing food to a table or accommodate dishes returned from the table and deliver the returned dishes to the dishwashing robot WDR.

The functional portion 280 stores serving objects. The functional portion 280 may also perform a cold/warm function to maintain a temperature of food during movement.

A communicator 260 may receive serving object information from the control server 500 to monitor the service area or the table robot TR disposed in the service area, or the cooking robot CR to cook food to be provided to the service area.

In addition, as shown in FIG. 9, the controller 250 of the serving robot determines the movement sensitivity level based on material characteristics of the serving objects, table information, and complexity information on complexity within the service area, among the information received by the communicator 260. The mover 290 of the serving robot also moves the robot based on the determined movement sensitivity level.

The serving robot includes the functional portion 280 with a tray. The functional portion 280 may notify employees or customers of taking-out dishes placed on that tray. Further, the controller 250 of the serving robot may readjust the movement sensitivity level to improve a moving speed of the robot after the dishes are taken out.

Figure 16:
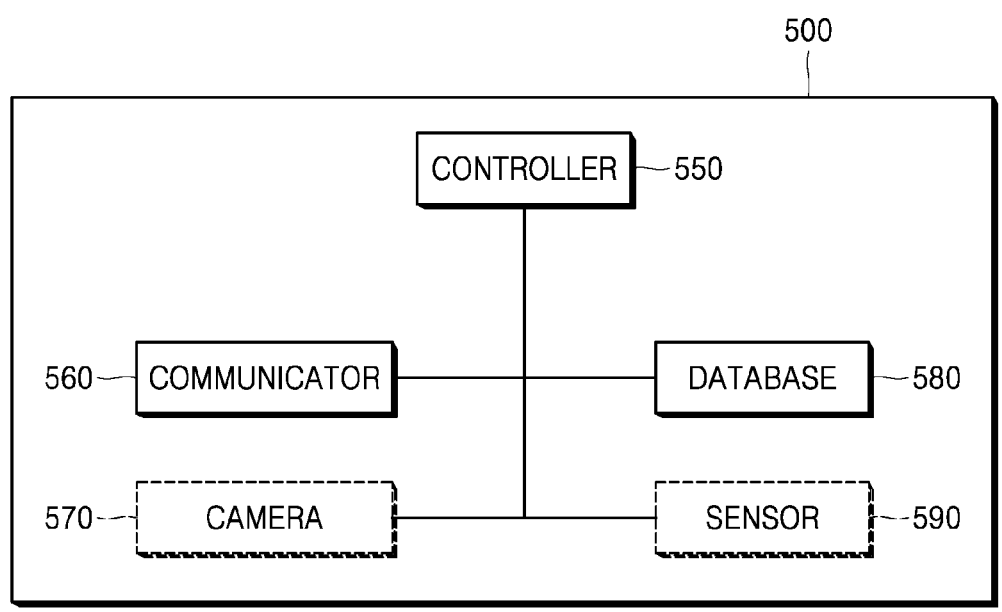
FIG. 16 shows an example control server according to an embodiment of the present disclosure.

FIG. 16 shows an example control server according to an embodiment of the present disclosure. The control server may receive information from a plurality of robots, process the received information, and may transmit the processed information to other robots. The control server may transmit the information to other robots. Alternatively, the control server may process the information collected within the service area as important information or rearrange a processing sequence to transmit it to other robots.

For example, the controller 550 of the control server 500 may rearrange the sequence of orders such that the cooking robot CR or the food material pick up robot PR efficiently cooks according to order situations.

Alternatively, the controller 550 of the control server 500 may control the movement of the serving robot, control removal of dishes, or control or instruct the operation of the dishwashing robot WDR according to the food orders from the menu and cooking situation of the foods.

The communicator 560 communicates with a plurality of robots. A database 580 may select and store some of various pieces of information generated within the service area 1. Various pieces of information such as a number of people who have entered the service area 1 at a specific time, reservation states, types of ordered food, and a situation of leftover food at each table are accumulatively stored in a database 580. Subsequently, the controller 550 of the control server 500 may recommend a menu customized to the customer. Alternatively, the controller 550 of the control server 500 may predict the order from the customers in advance and may instruct the cooking robot CR or the dishwashing robot WDR to perform advance preparation.

A camera 570 and a sensor 590 may each be optionally disposed within the service area 1 and the control server 500 may instruct the specific tasks to the robots based on the information received from the camera 570 and the sensor 590.

Artificial intelligence is a field of studying artificial intelligence or methodology of implementing artificial intelligence, and machine learning is a field of defining various problems which are handled in the field of artificial intelligence and studying methodology of solving the problems. Machine learning is also defined as an algorithm for enhancing performance of a certain operation through steady experiences thereof.

An artificial neural network (ANN) is a model which is used in machine learning and may refer to all models having problem solubility which include neurons (nodes) forming a network by coupling to synapses. An ANN is defined by a connection pattern between neurons of different layers, a learning process of updating model parameters, and an activation function of generating an output value.

An ANN selectively includes an input layer, an output layer, and one or more hidden layers. Each layer includes one or more neurons, and an ANN includes synapses connecting neurons. In an ANN, each neuron outputs input signals which are input from synapses, a weighting value, and a function value of an activation function with respect to deflection.

A model parameter refers to a parameter which is determined by learning and includes a weighting value for connection by synapses and deflection of neurons. A hyper-parameter refers to a parameter which is to be set before learning in a machine learning algorithm and includes a learning rate, a repetition number, a minimum arrangement size, and an initialization function.

The purpose of learning of an ANN is to determine model parameters that minimize a loss function. A loss function may be used as an indicator for determining optimal model parameters in the course of learning an ANN.

Machine learning may be classified into supervised learning, unsupervised learning, and reinforcement learning depending on learning types.

Supervised learning refers to a learning method for causing an ANN to learn in a state in which a label is given to learning data, where a label refers to a correct answer (or a resultant value) which is to be inferred by the ANN when learning data is input to the ANN. Unsupervised learning refers to a learning method for causing an ANN to learn in a state in which a label is not given to learning data. Reinforcement learning refers to a learning method for causing an agent which is defined in a certain environment to learn selection of an action or an action sequence of maximizing cumulative compensation in each state.

Machine learning which is implemented by a deep neural network (DNN) including a plurality of hidden layers is also referred to as deep learning, and deep learning is a part of machine learning. In the following description, machine learning includes deep learning.

The artificial intelligence of the controller 250, i.e., subcomponents of the controller 250 of the robot 200 may perform a function for artificial intelligence. The artificial intelligence of the controller 250 may include software or hardware.

The artificial intelligence of the controller 550, i.e., subcomponents of the controller 550 of the control server 500 may perform a function for artificial intelligence. The artificial intelligence of the controller 550 may include software or hardware.

In this case, the communicator 280 of the robot 200 may transmit and receive data to and from a robot that provides another AI function or external devices such as an control server 500 which provides functions of AI server using wired or wireless communication technology. For example, the communicator 280 may transmit and receive sensor information, a user input, a learning model, a control signal, and the like to and from external devices.

The control server 500 may provide artificial intelligence functions of the AI server.

Examples of communication technology which is used by the communicator 280 include global system for mobile communication (GSM), code-division multi access (CDMA), long-term evolution (LTE), 5G, wireless LAN (WLAN), wireless-fidelity (Wi-Fi), Bluetooth™, radio frequency identification (RFID), infrared data association (IrDA), ZigBee, and near-field communication (NFC).

The interface 270 of robot 200 acquires various types of data. Also, the control server 500 acquires various types of data.

The interface 270 may include a camera that receives an image signal, a microphone that receives an audio signal, and a user input that receives information from a user. Information acquired by the obstacle sensor, the camera sensor, or the microphone is referred to as sensing data or sensor information.

The interface 270, various types of sensors and, and a wheel encoder of the mover 290 may acquire learning data for model learning, input data which is to be used for acquiring an output using a learning model. The elements may acquire raw input data. In this case, the controller 250 or 550 or the artificial intelligence extracts input features as a pre-process for input data.

The artificial intelligence causes a model constituted by an ANN to learn using learning data. A learned ANN is referred to as a learning model. A learning model may be used to infer a resultant value with respect to new input data instead of learning data, and the inferred value may be used as a basis for determination which is used for a robot 200 to perform a certain operation.

The artificial intelligence of controller 250, 550 may perform AI processing along with the learning processor.

The artificial intelligence of the controller 250 includes a memory which is incorporated into the robot 200 or implemented therein. Alternatively, the artificial intelligence of the controller 250 may be implemented using an independent memory, an external memory coupled to the robot 100, or a memory which is held in an external device. This is same to the control server 500.

The robot 200 acquires at least one of internal information of the robot 200, surrounding environmental information of the robot 200, and user information using various sensors.

Examples of the sensors included in the robot 200 include a proximity sensor, an illuminance sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a light detection and ranging (LiDAR) sensor, an obstacle sensor, a camera sensor, and a radar.

The interface 270 generates an output associated with a visual sense, an auditory sense, or a haptic sense.

The interface 270 includes a display that outputs visual information, a speaker that outputs auditory information, and a haptic portion that outputs haptic information.

A memory built in the robot 200 store data for supporting various types of functions of the robot 200. For example, the memory may store input data, learning data, learning models, and learning histories which are acquired by various sensors and the interface 270 which are built in the robot 200.

The controller 250 may determine at least one executable operation of the robot 200 based on information which is determined or generated using a data analysis algorithm or a machine learning algorithm. The controller 250 may perform the determined operation by controlling the elements of the robot 200.

For this purpose, the controller 250 may request, retrieve, receive, or utilize data in the artificial intelligence or the memory, and control the elements of the robot 200 such that a predicted operation or an operation determined to be preferable out of one or more executable operations is executed.

When cooperation with an external device is used for executing the determined operation, the controller 250 may generate a control signal for controlling the external device and transmit the generated control signal to the external device.

The controller 250 may acquire intention information from a user input and determine requirements of the user on the basis of the acquired intention information.

The controller 250 may acquire intention information corresponding to a user input using at least one or more of a speech-to-text (STT) engine for converting a speech input into text and a natural language process (NLP) engine for acquiring intention information in a natural language.

At least one of the STT engine or the NLP engine may be constituted by an ANN in accordance with a machine learning algorithm. At least one of the STT engine or the NLP engine may be an engine which has learned by the artificial intelligence, an engine which has learned by the learning process of the control server 500, or an engine which has learned by distributed processes thereof.

The controller 250 may collect history information including operation details of the robot 200 or feedback of a user which is used for the operation and store the collected history information in the memory or the artificial intelligence or transmit the collected history information to an external device such as the control server 500. The collected history information may be used to update a learning model.

The controller 250 may control at least a part of the elements of the robot 200 to drive an application program stored in the memory. In addition, the controller 250 may allow two or more of the elements of the robot 200 to operate in combination to drive an application program.

Alternatively, an independent artificial intelligence server (an AI server) communicating with the robot 200 may be provided and process information which is provided by the robot 200.

An artificial intelligence server, for example, an control server 500, refers to a device that causes an ANN to learn using a machine learning algorithm or uses a learned ANN. The control server 500 may include a plurality of servers and perform distributed processes and may be defined as a 5G network. The control server 500 may be provided as a portion of an robot 200 and performs at least a part of AI processing together.

The controller 550 of control server 500 may include a learning processor for AI processing.

The controller 550 of control server 500 may include memory with a model storage. The model storage stores a model which is learning or learned (or an artificial neural network) via the learning processor.

The learning processor causes the artificial neural network to learn using learning data. A learning model may be used in a state in which it is mounted in the control server 500 of an ANN or may be used in a state in which it is mounted in an external device such as the robot 200.

A learning model may be implemented in hardware, in software, or in a combination of hardware and software. When a part or the whole of a learning model is implemented in software, one or more instructions constituting the learning model may be stored in the memory.

The controller 550 of control server 500 infers a resultant value for new input data using a learning model and a response or a control command based on the inferred value.

In particular, in the present disclosure, the artificial intelligence of the controller 250 of robot 200 or the controller 550 of control server 500 may provide service in service area.

According to the present disclosure, when the artificial intelligence of the controller 250 is mounted on the robot 200, it is possible to improve accuracy in providing service in service area.

For example, an AI technology may be used for the robot 200, and the robot 200 may include a guide robot, a transport robot, a cleaning robot, a wearable robot, an entertainment robot, a pet robot, an unmanned flying robot, and the like.

The robot 200 may include a robot controller that controls operation, and the robot controller may refer to software or a chip implemented as hardware.

The robot 200 obtains state information related to the robot based on sensor information obtained from various types of sensors or detects (or recognizes) the surrounding environment and an object or generates map data, or determines a moving route and move plans of the robot, or determines response to user interaction, or determines operation of the robot.

The robot 200 may use sensor information acquired from at least one sensor among a LiDAR, a radar, and a camera to determine a movement route and move plans of the robot 200.

The robot 200 may perform the above operations using a learning model including at least one ANN. For example, the robot 200 may recognize a surrounding environment and an object using a learning model and may determine operation of the robot 200 based on the recognized surrounding environment information or object information. The learning model may be directly learned by the robot 100a or may be learned by an external device such as the control server 500.

In this case, the robot 200 may perform operation of the robot 100 by generating a result using a direct learning model and may also perform the operation of the robot 200 by transmitting sensor information to the external device such as the control server 500 and receiving the generated result thereof.

The robot 200 determines a moving route and move plans of the robot 200 based on at least one of map data, object information detected from sensor information, or object information obtained from an external device, and controls the driver to determine the moving route and the move plans of the robot 200 to move the robot 200.

The map data may include object identification information on various types of objects disposed in the space where the robot 200 moves. For example, the map data may include object identification information related to fixed objects such as walls and doors and movable objects such as flower pots and desks. The object identification information may include a name, a type, a distance, a position, and the like.

In some examples, the robot 200 may control the driver based on the control/interaction of the user, to thereby perform operation or moveling of the robot 200. In this case, the robot 200 may obtain intention information related to the interaction determined based on the user's operation or voice utterance, and determine the response based on the obtained intention information to perform the operation of the robot 200.

In some examples, the robot 200 performs autonomous driving, and in this process, the AI technology is applied, and may include a mobile robot, a vehicle, an unmanned flight vehicle, and the like.

The autonomous robot 200 may include an autonomous driving control portion that controls a function for the autonomous driving, and the autonomous control portion may refer to software or a chip implemented as hardware. The autonomous driving controller may be included in the robot 200 as a component of the autonomous robot 200 and the autonomous driving controller is provided as additional hardware outside of the robot 200 to be connected thereto.

The autonomous robot 200 may obtain state information related to the autonomous robot 200 based on sensor information obtained from various types of sensor or may detect (or recognize) the surrounding environment and an object or may generate map data or may determine a move route and move plans of the robot 200, or may determine operation of the robot 200.

The autonomous robot 200 may use sensor information obtained from at least one sensor among a LiDAR, a radar, and a camera, similar to the robot 200, to determine the movement route and move plans of the robot 200.

In particular, the autonomous robot 200 may recognize the environment with respect to or the objects disposed in invisible areas or areas having a predetermined distance or more by receiving the sensor information from the external devices or may receive information directly recognized by the external devices.

The autonomous robot 200 may perform the above operations using a learning model including at least one ANN. For example, the autonomous robot 200 may recognize a surrounding environment and an object using a learning model and may determine a driving line of the robot based on the recognized surrounding environment information or object information. The learning model may be learned directly by the autonomous vehicle 200 or may be learned by an external device such as the AI server 700.

In this case, the autonomous robot 200 may perform operation by generating a result using a direct learning model and may also transmit sensor information to an external device such as an AI server 700 and may receive the generated result to perform the operation of the robot 200.

The autonomous robot 200 determines a movement route and move plans of the autonomous robot 200 based on at least one of map data, object information detected from sensor information, or object information obtained from an external device, and controls the driver to move the autonomous travelling robot 200 along the determined movement route and according to travelling plans of the robot 200.

The map data may include object identification information related to various types of objects disposed in a space (e.g., a road) where the autonomous vehicle 200b moves. For example, the map data may include object identification information related to fixed objects such as street lights, rocks, buildings, and movable objects such as vehicles and pedestrians. The object identification information may include a name, a type, a distance, a location, and the like.

In some examples, the autonomous robot 200 may control the driver based on control/interaction of the user to perform operation of the robot 200 or move. In this case, the autonomous robot 200 may obtain the intention information related to the interaction based on operation of the user or voice utterance, and determine the response based on the obtained intention information to perform the operation thereof.

In some examples, the robot 200 may use the AI technology and autonomous driving technology, and may include guide robots, transport robots, cleaning robots, wearable robots, entertainment robots, pet robots, unmanned flying robots, and the like.

The robot 200 that performs a function for autonomous driving may be collectively referred to as a device that moves along a given moving line of the robot 200 without control of the user or moves by determining the moving line of the robot 200 by itself.

The robot 200 that performs a function for autonomous driving may use a common sensing method to determine at least one of a moving route or travelling plans of the robot 200. For example, the robot 200 that performs the autonomous driving function may determine at least one moving route or travelling plans of the robot 200 based on the information sensed by a LiDAR, a radar, and a camera.

Although components included in the exemplary embodiment of the present disclosure are described as being combined to one, or as being coupled to operate, such exemplary embodiment is not necessarily limited to this specific example, and the components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The storage medium of the computer program may include a storage medium including a semiconductor recording element, an optical recording medium, a magnetic recording medium. Further, the computer program that implements the embodiment of the present disclosure may include a program For example transmitted in real time through an external apparatus.

While the present disclosure has been mainly described referring to the exemplary embodiments of the present disclosure hereinabove, various modifications and changes may be made at the level of those skilled in the art. Therefore, unless such modifications and changes do not deviate from the range of the present disclosure, it will understand that they are included in the scope of the present disclosure.

Other embodiments are within the scope of the following claims.

What is claimed is:

1. A system of providing a service by controlling robots within a service area, comprising:
    a control server configured to receive information including customer information on a customer seated at a table within the service area and ordered menu item information for an order from a guide robot or a table robot disposed in the service area and transmit, to a cooking robot, the received information and cooking instruction information generated based on situations of a plurality of orders placed within the service area;
    the guide robot configured to move within the service area and guide the customer to a specific table;
    a serving robot configured to move food completed by the cooking robot to a table from which the order was received; and
    the table robot disposed on the table and configured to receive ordered menu item information and output information on a situation in which the cooking robot cooks or the food delivered by the serving robot as voice information or visual information,
    wherein the serving robot is configured to receive dishes returned from the table and deliver the returned dishes to a dishwashing robot, and
    wherein the dishwashing robot is configured to receive information on a dish needed in the service area from the control server and determine priorities of washing dishes based on the received information.

2. The system of providing the service by controlling the robots within the service area of claim 1, further comprising a food material pickup robot configured to contain food materials used to perform the cooking, by the cooking robot, based on the cooking instruction information to a cooking dish and to deliver the cooking dish to the cooking robot.

3. The system of providing the service by controlling the robots within the service area of claim 2,
    wherein the control server is configured to generate the cooking instruction information based on a sequence or similarity among orders received from the plurality of tables disposed in the service area and a food completion time point determined using temporal characteristics or serving characteristics of the ordered menu item and
    wherein the control server is configured to transmit the cooking instruction information to each of the food material pickup robot and the cooking robot.

4. The system of providing the service by controlling the robots within the service area of claim 1, wherein the serving robot is configured to receive, from the control server, properties of serving objects, table information, and complexity information on complexity within the service area and determine a movement sensitivity level.

5. The system of providing the service by controlling the robots within the service area of claim 1, wherein the cooking robot comprises:
    a communicator configured to receive ordered menu item information from the control server to monitor a service area or the table robot disposed in the service area;
    a controller configured to generate cooking instruction information based on a sequence or similarity among the foods ordered from a plurality of tables disposed in the service area and a food completion time determined using temporal characteristics or serving characteristics of the ordered menu items; and
    a functional portion configured to perform cooking operation based on the cooking instruction information.

6. The robot of claim 5, wherein the functioning portion of the cooking robot is configured to receive a cooking dish containing food materials used for cooking from a food material pickup robot.

7. A method for providing service by controlling robots within a service area, comprising:
    receiving, by a control server, information including customer information on a customer seated at a table within the service area and ordered menu item information for an order from a guide robot or a table robot disposed within the service area;
    transmitting, by the control server, the received information and cooking instruction information generated based on a situation of a plurality of orders placed within the service area to a cooking robot;
    guiding, by the guide robot, the customer to a specific table while moving within the service area;
    moving, by a serving robot, food completed by the cooking robot to a table from which the order was received;
    receiving, by the table robot disposed on the table, ordered menu item information and outputting information on a situation in which the cooking robot cooks or food delivered by the serving robot as voice information or visual information,
    receiving, by the serving robot, dishes returned from the table and transmitting the dishes to a dishwashing robot; and
    receiving, by the dishwashing robot, dish information on a dish needed within the service area from the control server and determining priorities of washing dishes based on the received information.

8. The method for providing the service by controlling the robots within the service area of claim 7, further comprising:
    confirming, by the guide robot, reservation by approaching to the customer entering the service area or guiding the customer to a needed table; and
    receiving, by the table robot, the customer information and customer arrival information provided by the guide robot to output a welcome message.

9. The method for providing the service by controlling the robots within the service area of claim 8, further comprising:
  identifying, by the guide robot, a reservation customer by recognizing a face of a customer entering the service area or based on tagging information or personal information input by the customer;
  selecting, by the guide robot, a table seated by the customer based on customer member information or reservation information input by the customer; and
  guiding, by the guide robot, the customer to the selected table.

10. The method for providing the service by controlling the robots within the service area of claim 8, further comprising:
  generating, by the table robot, recommended menu information based on the customer information to output the generated recommended menu information as visual information; and
  explaining, by the table robot, food provided on the table or monitoring a speed at which food is removed from dishes on the table or monitoring an emergency occurring at the table, or transmitting input command information on command ordered by the customer at the table through voice to the control server or the serving robot, or the cooking robot.

11. The method for providing the service by controlling the robots within the service area of claim 7, further comprising:
  containing, by a food material pickup robot, food materials used to cook by the cooking robot based on the cooking instruction information to a cooking bowl; and
  delivering, by the food material pickup robot, cooking dishes to the cooking robot.

12. The method for providing the service by controlling the robots within the service area of claim 11, further comprising:
  generating the cooking instruction information based on sequence or similarity between foods ordered from a plurality of tables disposed within the service area and a food completion time point determined using temporal characteristics or serving characteristics of ordered menu items; and
  transmitting, by the control server, the cooking instruction information to each of the food material pickup robot and the cooking robot.

13. The method for providing the service by controlling the robots within the service area of claim 7, further comprising determining, by the serving robot, a movement sensitivity level after receiving, from the control server, material properties of serving food, table information, and complexity information on complexity within the service area.

14. The system of providing the service by controlling the robots within the service area of claim 1,
  wherein the guide robot is configured to approach to the customer entering the service area to confirm reservation or guide the customer to the table, and
  wherein the table robot is configured to receive the customer information provided by the guide robot and customer arrival information and to output a welcome message.

15. The system of providing the service by controlling the robots within the service area of claim 14, wherein the guide robot is configured to identify a reservation customer by recognizing a face of the customer entering the service area or based on tagging information or personal information input by the customer and select a seating table for the customer based on customer member information or reservation information input by the customer, and guide the customer to the selected table.

16. The system of providing the service by controlling the robots within the service area of claim 14,
  wherein the table robot is configured to generate recommendation menu information based on the customer information and output the generated recommendation menu information as the visual information, and
  wherein the table robot is configured to explain food provided on the table or monitor a speed at which food is removed from dishes on the table or monitor an emergency occurring at the table, or transmit input command information on command input by the customer through voice at the table to the control server or the serving robot, or the cooking robot.

* * * * *